United States Patent [19]

Hosoi et al.

[11] Patent Number: 5,719,333
[45] Date of Patent: Feb. 17, 1998

[54] ACCELERATION SENSOR

[75] Inventors: Takashi Hosoi; Satoshi Hiyama; Sukeyuju Shinotuka; Mizuho Doi; Hiroshi Yamakawa; Nariaki Kuriyama; Tomoyuki Nishio; Atsushi Inaba; Nobuhiro Fueki, all of Wako, Japan

[73] Assignee: Honda Giken Kogyo Kabushiki Kaisha, Tokyo, Japan

[21] Appl. No.: 376,155

[22] Filed: Jan. 20, 1995

[30] Foreign Application Priority Data

| Jan. 20, 1994 | [JP] | Japan | 6-004444 |
| Jan. 24, 1994 | [JP] | Japan | 6-005811 |
| Feb. 23, 1994 | [JP] | Japan | 6-064322 |
| Mar. 24, 1994 | [JP] | Japan | 6-054121 |

[51] Int. Cl.$^6$ ............................................. G01P 15/00
[52] U.S. Cl. ............................ 73/514.05; 73/514.33
[58] Field of Search ............ 73/204.22, 204.26, 73/497, 521, 514.05, 504.06, 504.05, 514.33; 338/34

[56] References Cited

U.S. PATENT DOCUMENTS

| 3,627,577 | 12/1971 | Dyeidel | 428/433 |
| 3,631,729 | 1/1972 | Moore | 73/516 |
| 3,635,095 | 1/1972 | Schuemann | 73/505 |
| 3,993,967 | 11/1976 | Saifi | 333/172 |
| 4,020,699 | 5/1977 | Schaffer | 73/497 |
| 4,026,159 | 5/1977 | Isakson et al. | 73/516 LM |
| 4,147,063 | 4/1979 | Bower et al. | 73/504 |
| 4,156,364 | 5/1979 | Hill | 73/194 F |
| 4,254,659 | 3/1981 | Benedetto et al. | 73/516 LM |
| 4,348,900 | 9/1982 | Takahashi et al. | 73/505 |
| 4,407,161 | 10/1983 | Ferrar | 73/505 |
| 4,408,490 | 10/1983 | Takahashi et al. | 73/497 |
| 4,533,935 | 8/1985 | Mochizuki | 257/538 |
| 4,542,650 | 9/1985 | Renken et al. | 73/204 |
| 4,584,878 | 4/1986 | Katsumo | 73/497 |
| 4,592,232 | 6/1986 | Moffatt et al. | 73/505 |
| 4,717,891 | 1/1988 | Ichise et al. | 331/17 |
| 4,930,349 | 6/1990 | Takahashi et al. | 73/497 |
| 4,951,507 | 8/1990 | Takahashi | 73/504.06 |
| 5,012,676 | 5/1991 | Takahashi et al. | 73/497 |
| 5,107,707 | 4/1992 | Takahashi | 73/514.39 |
| 5,270,960 | 12/1993 | Ikegami et al. | 364/571.03 |
| 5,385,046 | 1/1995 | Yamakawa et al. | 73/516 LM |
| 5,438,871 | 8/1995 | Hosoi et al. | 73/504.05 |
| 5,476,820 | 12/1995 | Fueki et al. | 437/250 |

FOREIGN PATENT DOCUMENTS

| 59-218913 | 12/1984 | Japan . |
| 63-81269 | 4/1988 | Japan . |
| 63-118667 | 5/1988 | Japan . |
| 63-293471 | 11/1988 | Japan . |
| 63-293472 | 11/1988 | Japan . |
| 63-298066 | 12/1988 | Japan . |
| 63-298067 | 12/1988 | Japan . |
| 63-298068 | 12/1988 | Japan . |
| 3176669 | 7/1991 | Japan . |

OTHER PUBLICATIONS

Nishio et al., U.S. Application Serial No. 08/409,197 filed Mar. 23, 1995.
Nishio et al., U.S. Application Serial No. 08/408,996 filed Mar. 23, 1995.
Doi et al., U.S. Application Serial No. 08/390,875 filed Feb. 17, 1995.
Shinotuka et al., U.S. Application Serial No. 08/384,910 filed Feb. 7, 1995.
English language Abstract of JP 3-176669.

*Primary Examiner*—Christine K. Oda
*Attorney, Agent, or Firm*—Lyon & Lyon LLP

[57] ABSTRACT

A very small and economical acceleration sensor which can detect acting acceleration with high sensitivity and high accuracy by precisely processing a semiconductor substrate and the like by using the photoengraving technique in a semiconductor manufacturing process to accurately form the elements themselves such as a sensor case, a cavity, a heater, a temperature-sensing resistor element, and a heat-type temperature-sensing resistor element, and the relative placement of each element. One embodiment of the acceleration sensor can detect acceleration acting from any of the three-dimensional directions.

23 Claims, 16 Drawing Sheets

- 6 Heat-type temperature-sensing resistor element
- 7 Cavity
- 3 Upper Sensor Case
- 2 Lower Sensor Case
- 8 Closed space
- 4 Cavity
- 5 Bridge
- 1 Acceleration Sensor Acceleration G

- 6 Heat-type temperature-sensing resistor element
- 1 Acceleration Sensor
- 2 Lower Sensor Case
- 9 Electrode
- 5 Bridge
- 4 Cavity

ACCELERATION SENSOR

BACKGROUND OF THE INVENTION

Field of the Invention

The present invention relates to an acceleration sensor for detecting acceleration acting on the sensor body, and, more particularly, to an acceleration sensor for detecting acceleration in the form of changes in the temperature distribution of gas in a closed space.

Description of the Related Art

Disclosed in Japanese Published Unexamined Patent Application No. 3-176669 is an acceleration sensor in which the equilibrium of the temperature distribution is formed by heating a gas enclosed in a closed space in a case, and the phenomenon in which the temperature distribution is changed while a gas flow is generated by the action of acceleration is detected as a change in the resistance of a resistance temperature sensor disposed within the case.

In the above conventional acceleration sensor, a thin-film-resistor temperature sensor serving as a heater is disposed in a resin case, and heated by applying current thereto. Resistance values are previously detected for the heated thin-film-resistor temperature sensor at various temperatures.

When acceleration acts on the acceleration sensor, a gas flow is generated in the case. The generated gas flow takes heat from the thin-film-resistor temperature sensor, thereby reducing its temperature so that the resistance of the thin-film-resistor temperature sensor sensor is changed.

Because the change in the resistance of the thin-film-resistor temperature sensor corresponds to the acceleration acting on the acceleration sensor, the acceleration is detected by converting the resistance of the thin-film-resistor temperature sensor to an electric signal.

The conventional acceleration sensor has, however, a problem that, although it can detect the absolute value of acceleration, it cannot detect the direction in which acceleration acts because it uses a heater heating the gas in the case and a thin-film-resistor temperature sensor for the heater also serving as a temperature-sensing element which detects the temperature change due to the action of acceleration.

In addition, the conventional acceleration sensor has a problem that, because the thin-film-resistor temperature sensor for the heater serves as both a heater and a temperature-sensing element, aging from deterioration is caused in the thin-film-resistor temperature sensor for the heater if the generated temperature is high, leading to variations in heat generation and reduced sensitivity to temperature so that the sensor cannot accurately detect acceleration.

Moreover, the conventional acceleration sensor has a relatively bulky size for the closed space, which results in a degraded response to the temperature change by the gas flow. Reduction of the size of the acceleration sensor is limited by its structure.

Furthermore, while the accuracy of acceleration detection depends on the positional accuracy of the thin-film-resistor temperature sensor for the heater, the conventional acceleration sensor has a structure in which the thin-film-resistor temperature sensor for the heater is directly installed on the case, which makes it difficult to accurately position the thin-film-resistor temperature sensor for the heater.

SUMMARY OF THE INVENTION

The present invention provides a very small acceleration sensor which is constructed by etching a semiconductor board or insulating substrate using a photoengraving process in a semiconductor manufacturing process, joining two sensor cases formed with a cavity therein to form a closed space, forming a bridge at the center of one of the sensor cases at the time the cavity is formed, and integrally placing a temperature-sensing resistor element and a heater in the bridge with the photoengraving process, and which accurately detects imbalances in the temperature distribution generated in the closed space by acceleration acting on the sensor case as a change in resistance of the temperature-sensing resistor element.

In addition, the present invention provides an acceleration sensor which can accurately detect the absolute value of acceleration acting on the sensor case in any two- or three-dimensional direction and the direction of action by arranging a pair of temperature-sensing resistor elements in the sensor case in one-dimensional (X axis), two-dimensional (X and Y axes) or three-dimensional (X, Y, and Z axes) axial directions.

As described, because the acceleration sensor is constructed by using the photoengraving process in the semiconductor manufacturing process, resistance values of the temperature-sensing resistor element and the heater and their positioning in the sensor case can be attained with high accuracy.

Therefore, the present invention can attain an acceleration sensor which eliminates problems inherent in the conventional acceleration sensor of poor response to the detection of acceleration due to limitations in the reduction of the size, poor accuracy of acceleration detection due to an inability to accurately position the temperature-sensing resistor element and the heater, time consumed for selecting the resistance for the temperature-sensing resistor element and the heater, and the occurrence of waste parts, and which present invention is very small in size, has excellent accuracy in acceleration detection, and is suitable for mass production.

3

Figure 10:
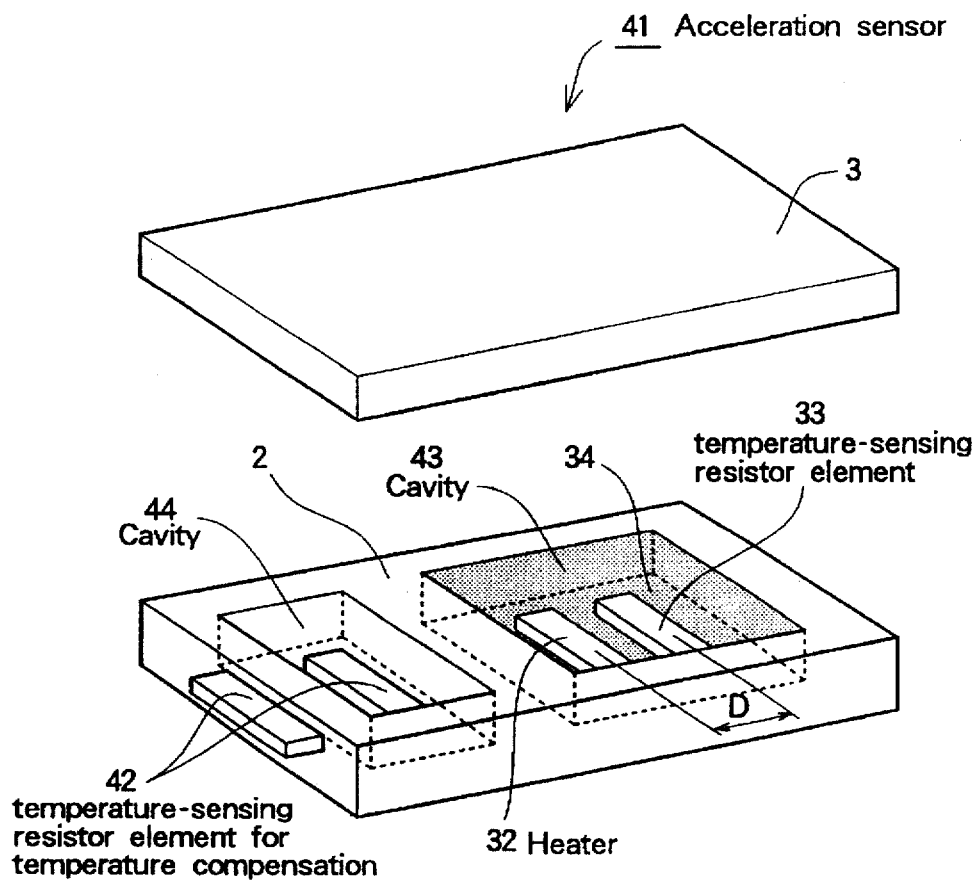
FIGS. 10 and 11 are an exploded perspective view and plan view, respectively, of the arrangement of a fifth embodiment of the acceleration sensor according to the present invention.
Figure 11:
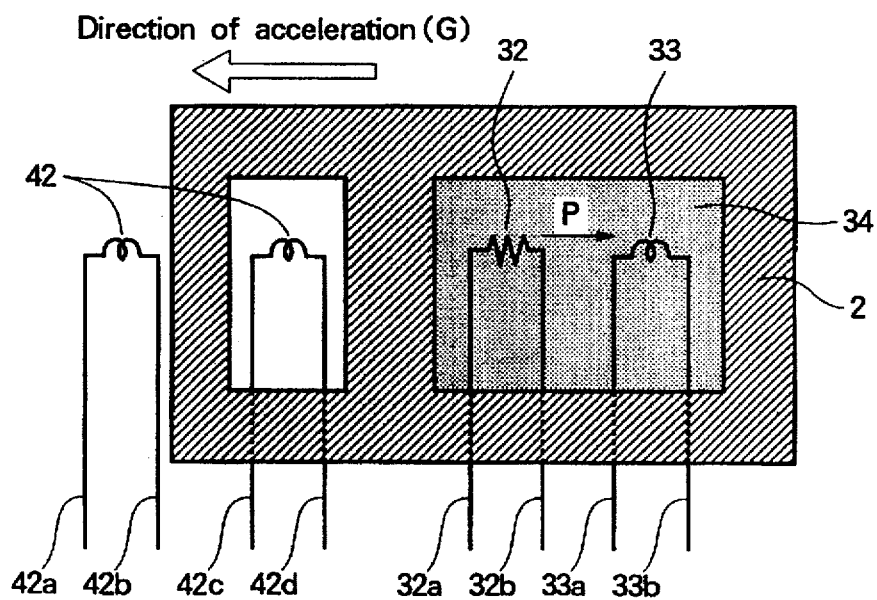
Figure 12:
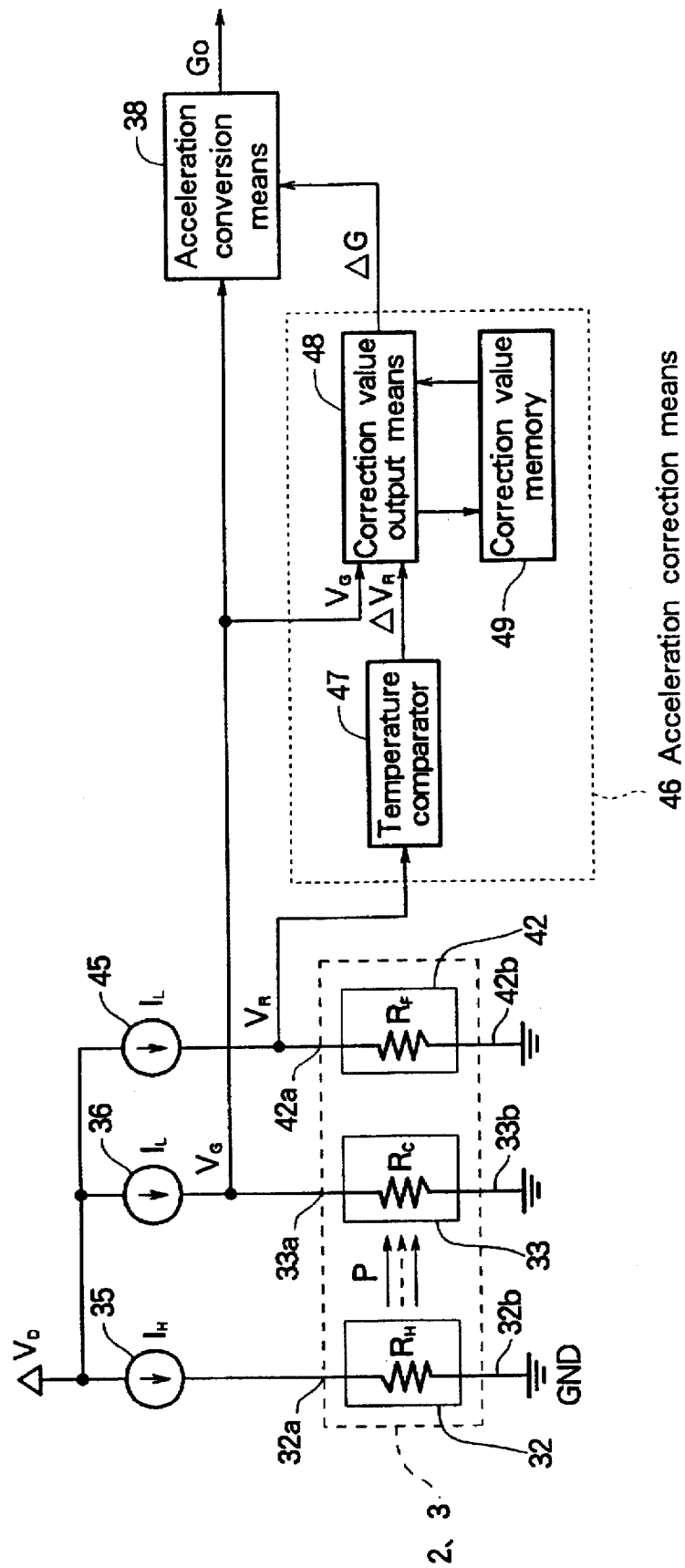
Figure 13:
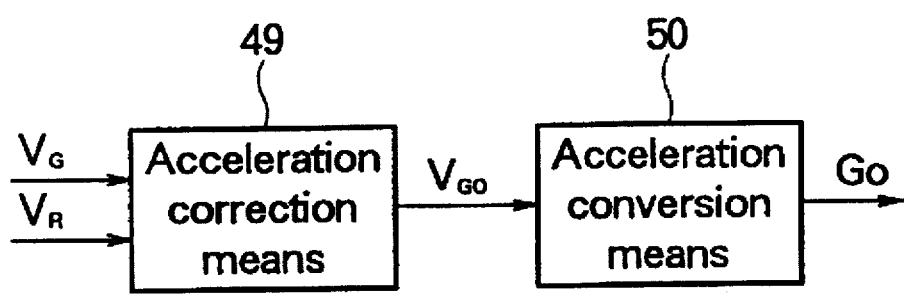
Figure 14:
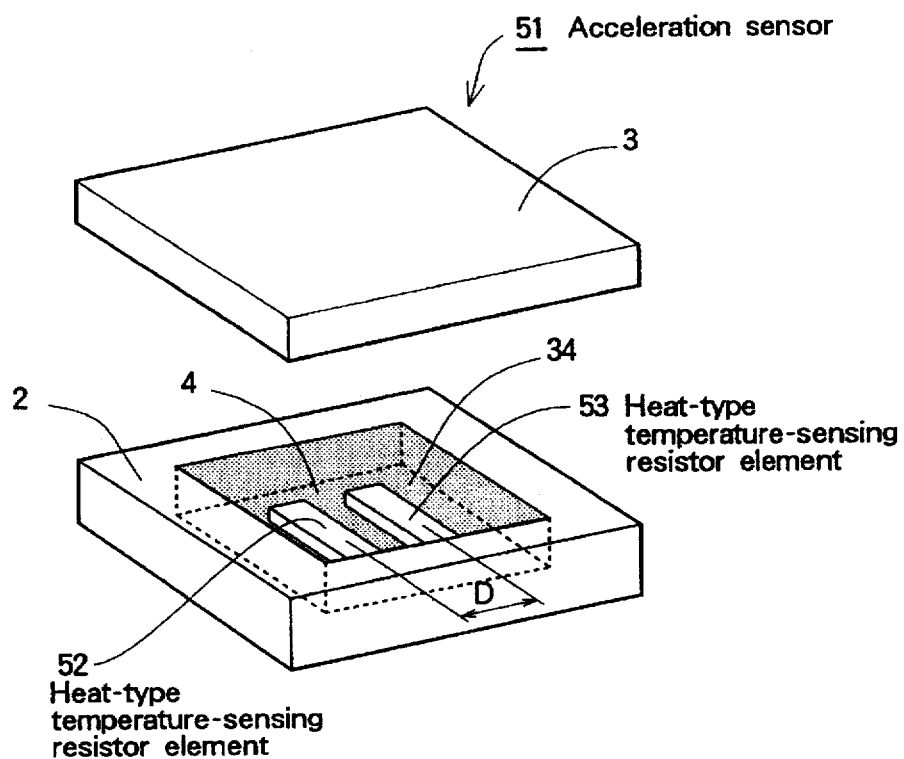
Figure 15:
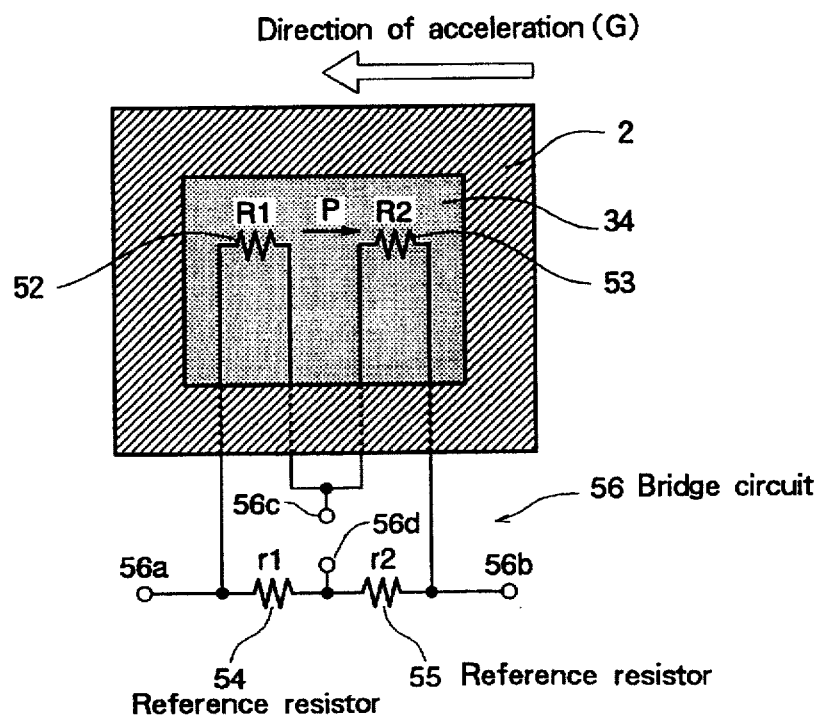
Figure 16:
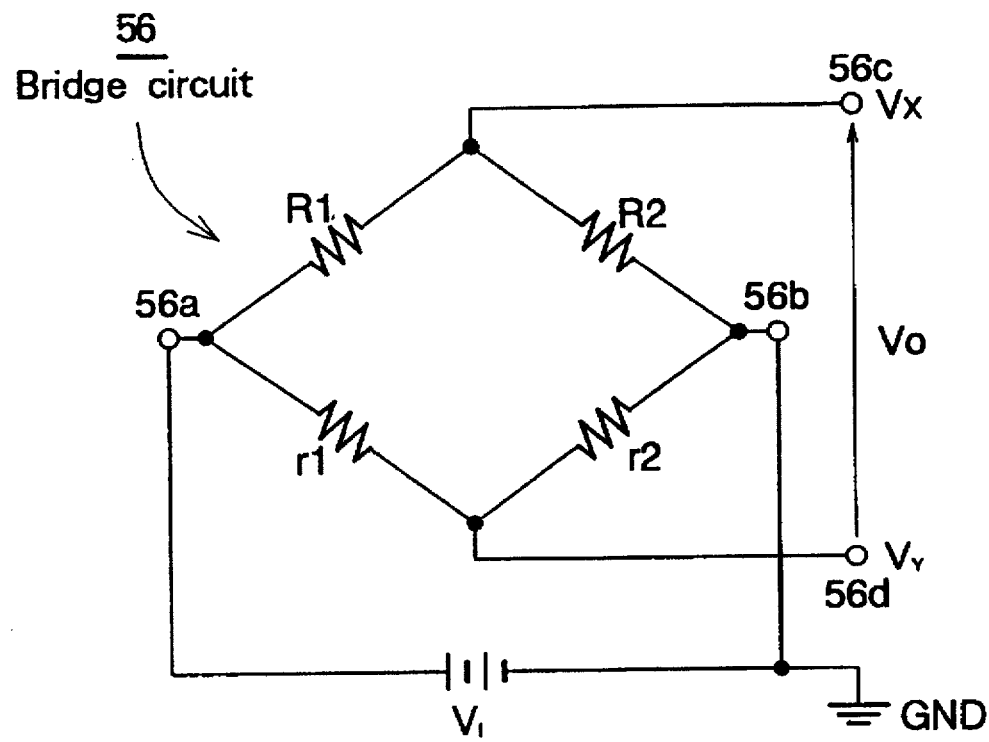
Figure 17:
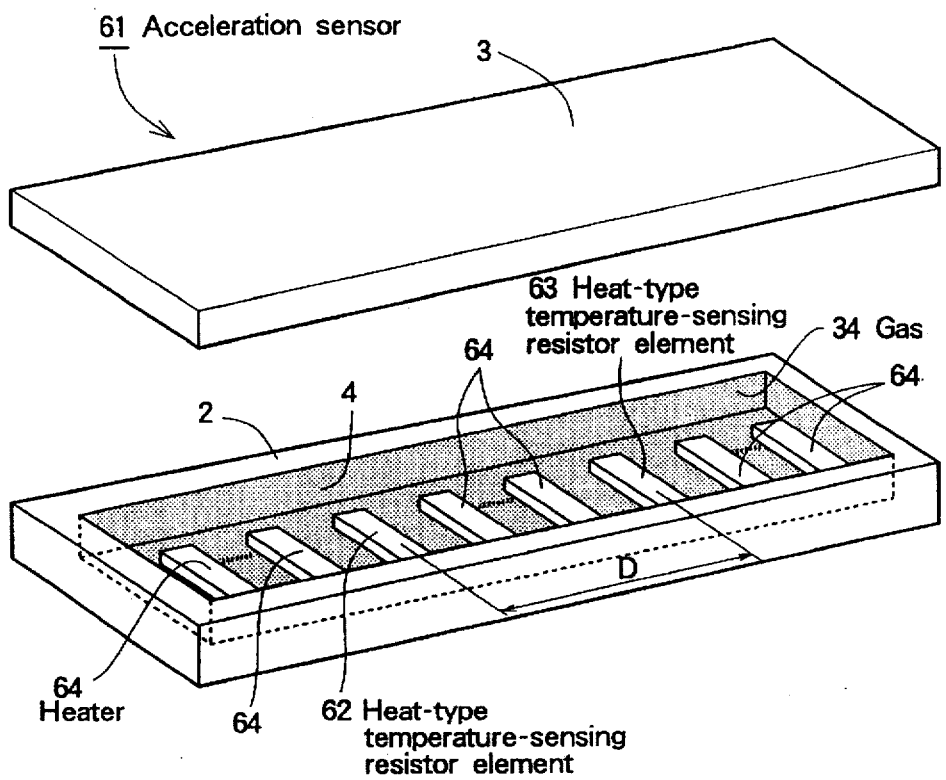
Figure 18:
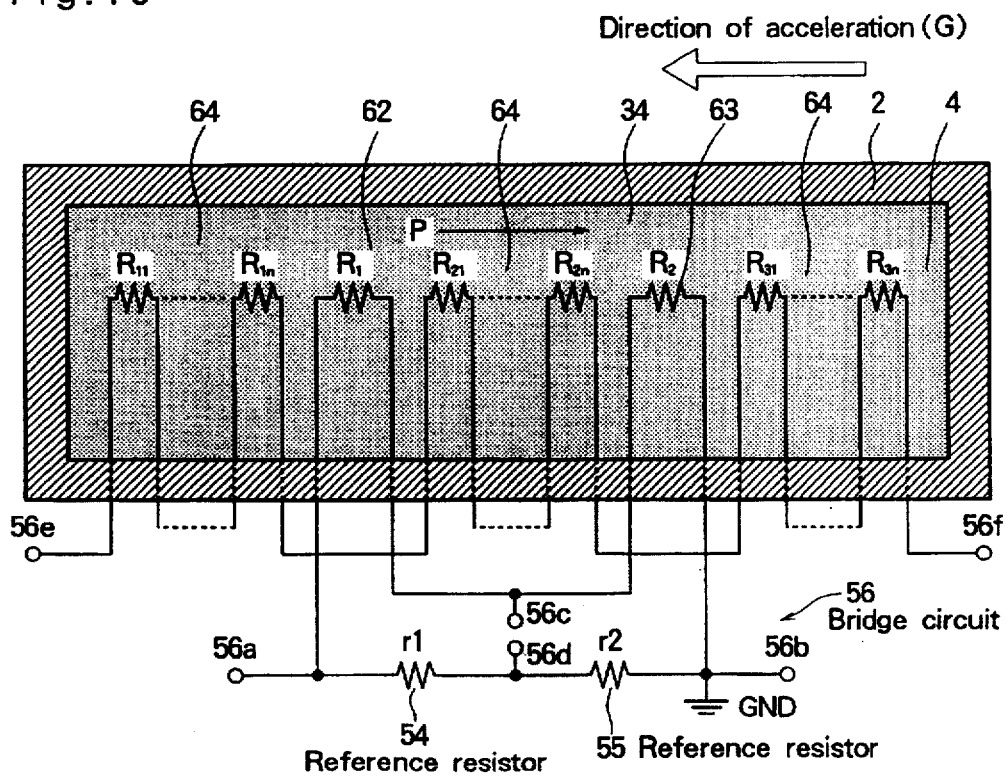
Figure 19:
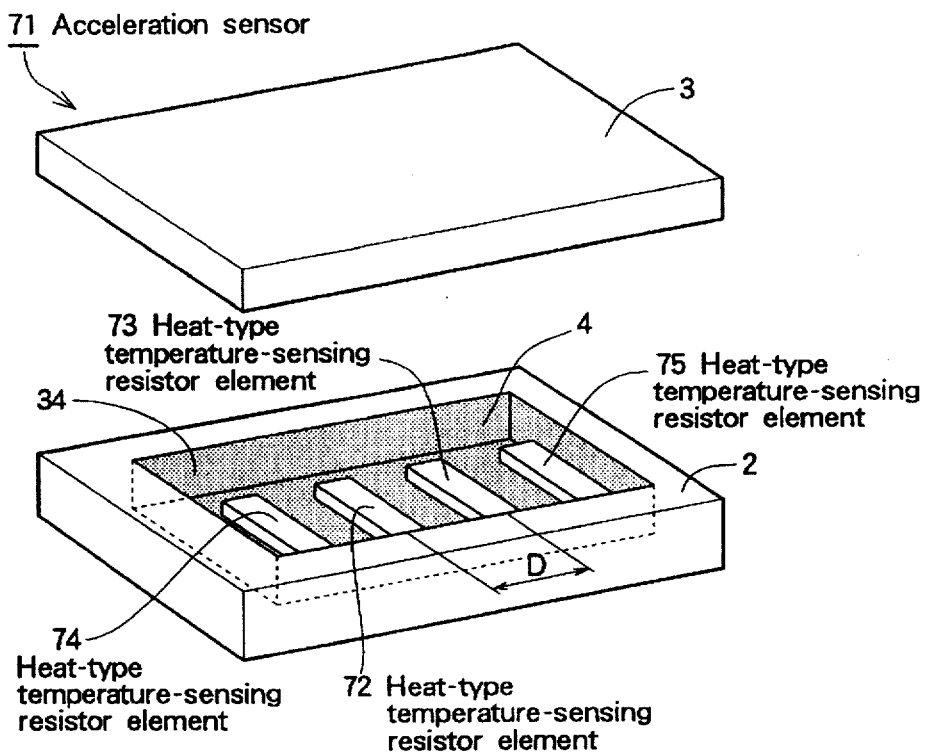
Figure 20:
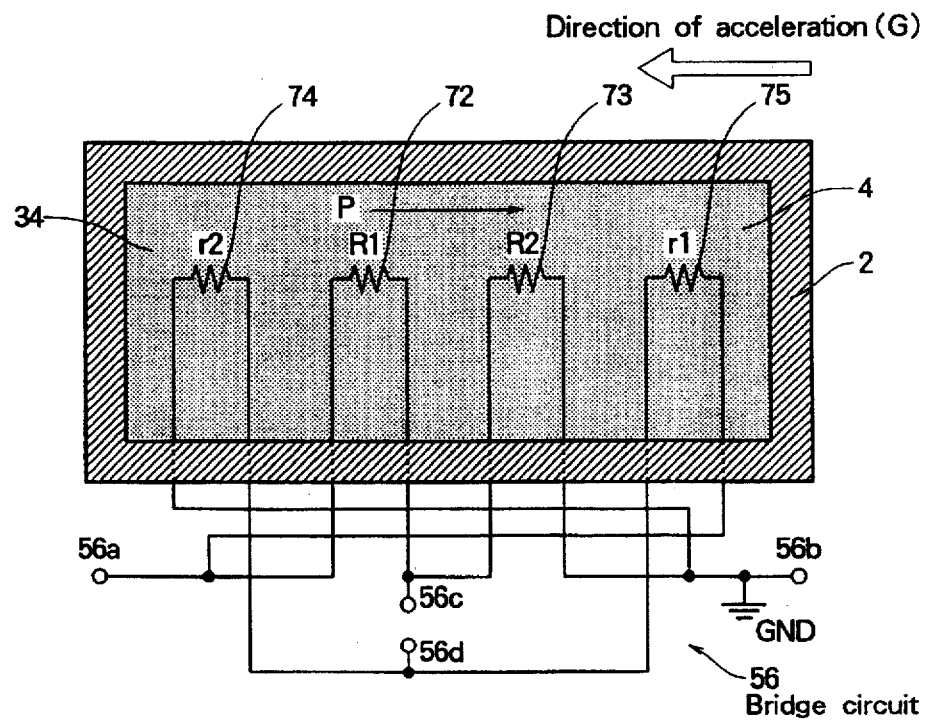
Figure 21:
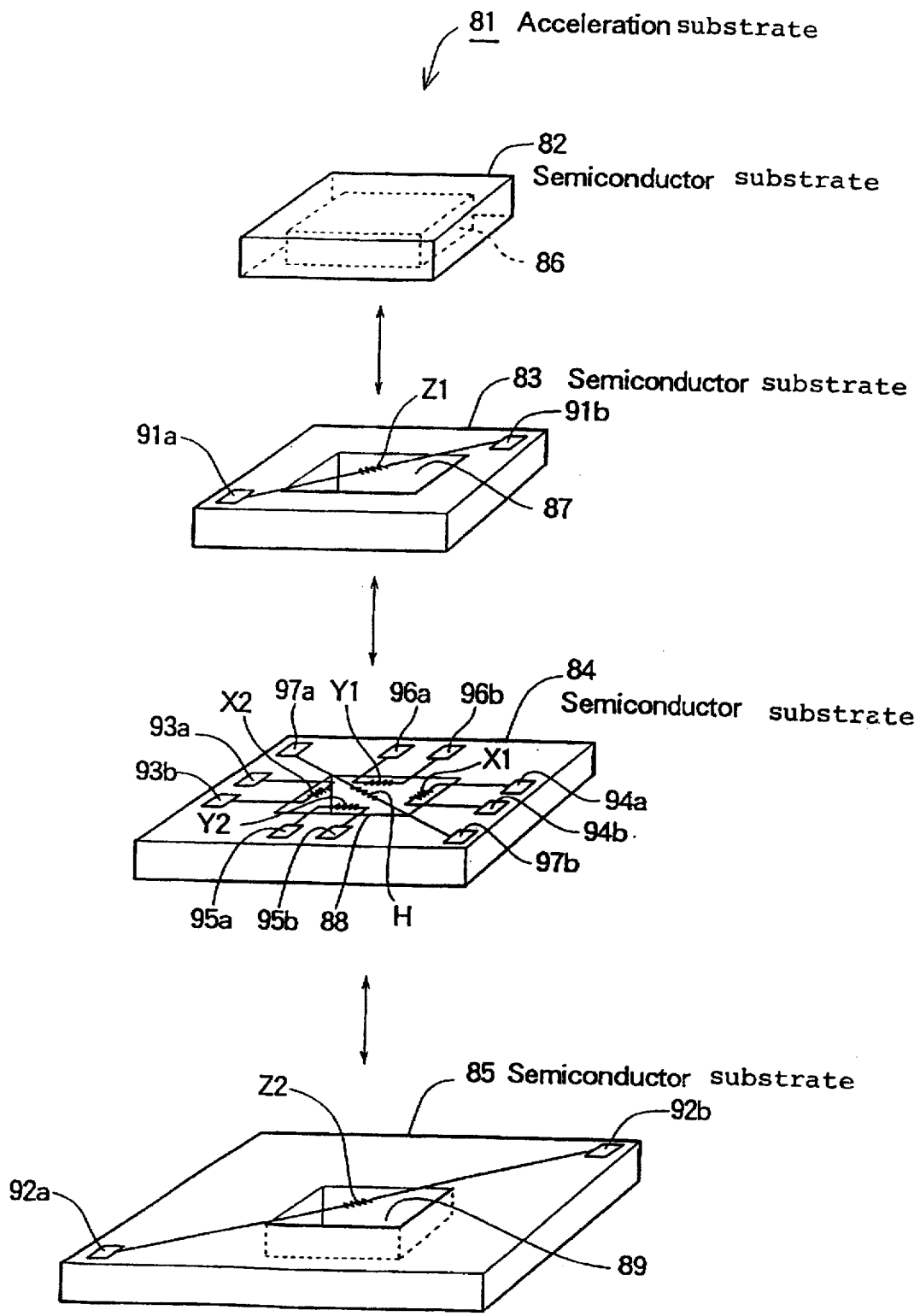
Figure 22A:
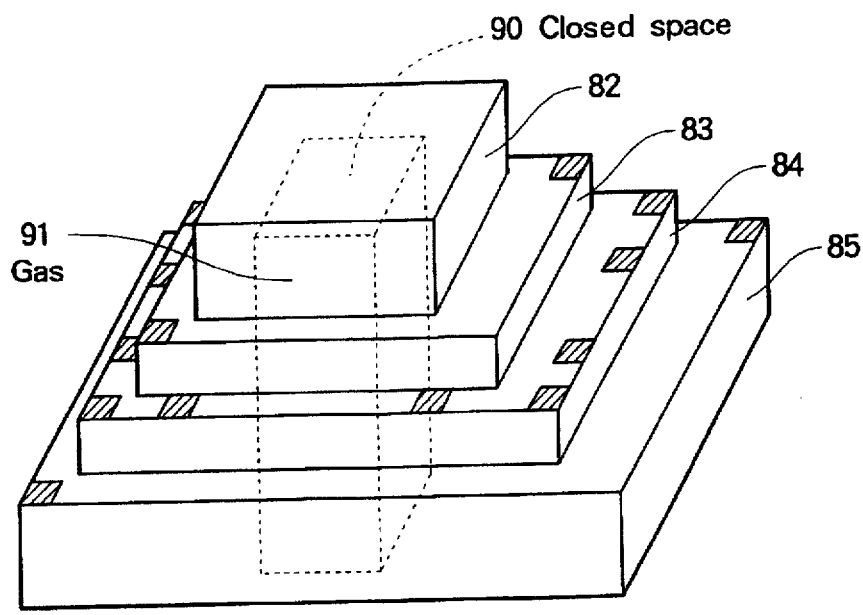
Figure 22B:
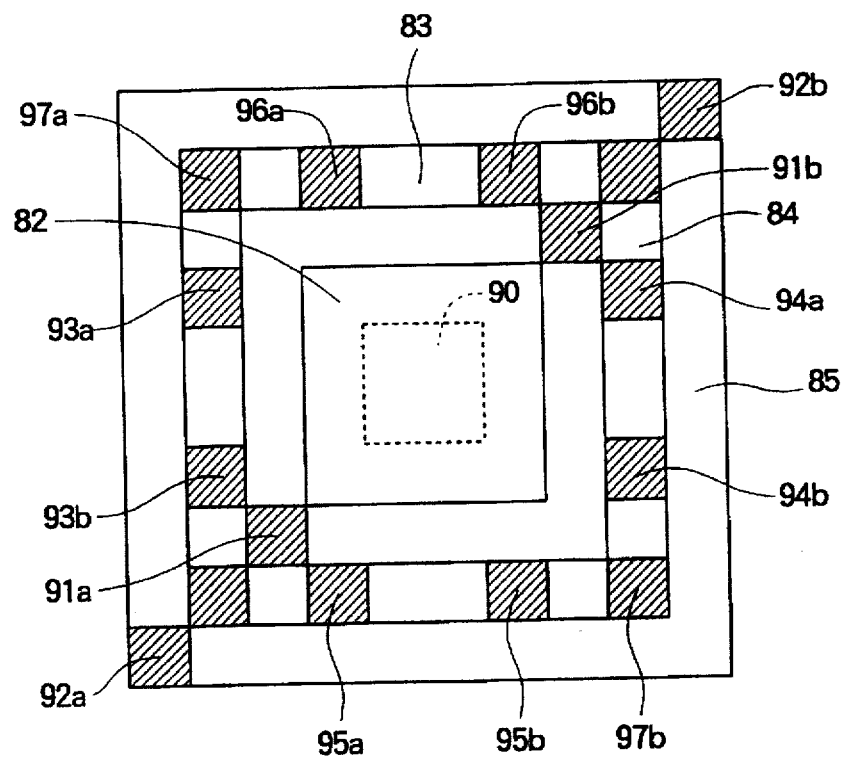
Figure 23:
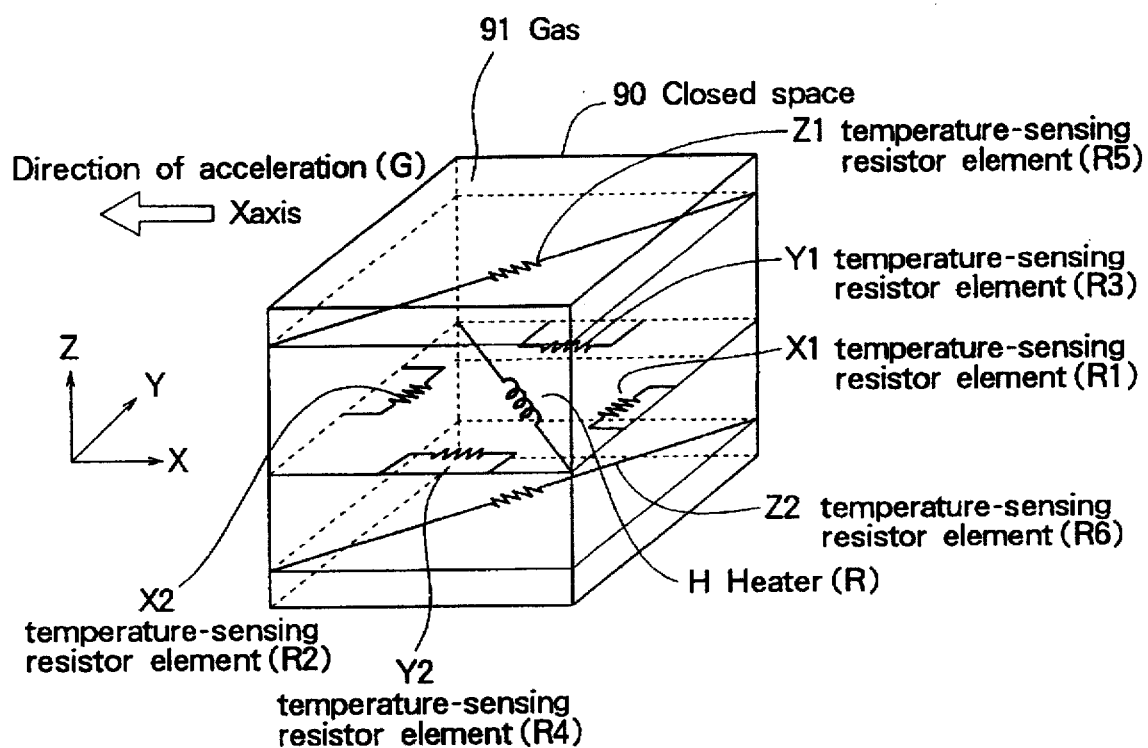

FIG. 12 is a functional block diagram for the detection of acceleration by using the acceleration sensor of FIGS. 10 and 11;

FIG. 13 is a block diagram of another embodiment of the acceleration correction means in FIG. 12;

FIGS. 14 and 15 are an exploded perspective view and a plan view, respectively, of the arrangement of a sixth embodiment of the acceleration sensor according to the present invention;

FIG. 16 is a bridge circuit diagram in the acceleration sensor in FIGS. 14 and 15;

FIGS. 17 and 18 are an exploded perspective view and a plan view, respectively, of the arrangement of a seventh embodiment of the acceleration sensor according to the present invention;

FIGS. 19 and 20 are an exploded perspective view and a plan view, respectively, of the arrangement of an eighth embodiment of the acceleration sensor according to the present invention;

FIG. 21 is the an exploded perspective view of arrangement of essential components of a ninth embodiment of the acceleration sensor according to the present invention;

FIG. 22A is a perspective view of the appearance of the acceleration sensor shown in FIG. 21;

FIG. 22B is a plan view of the acceleration sensor shown in FIG. 21;

FIG. 23 is a perspective diagram illustrating the operation of the acceleration sensor shown in FIG. 21; and FIGS. 24–27 are circuit diagram of the acceleration detection circuits of the acceleration sensor shown in FIG. 21.

DETAILED DESCRIPTION

Figure 1:
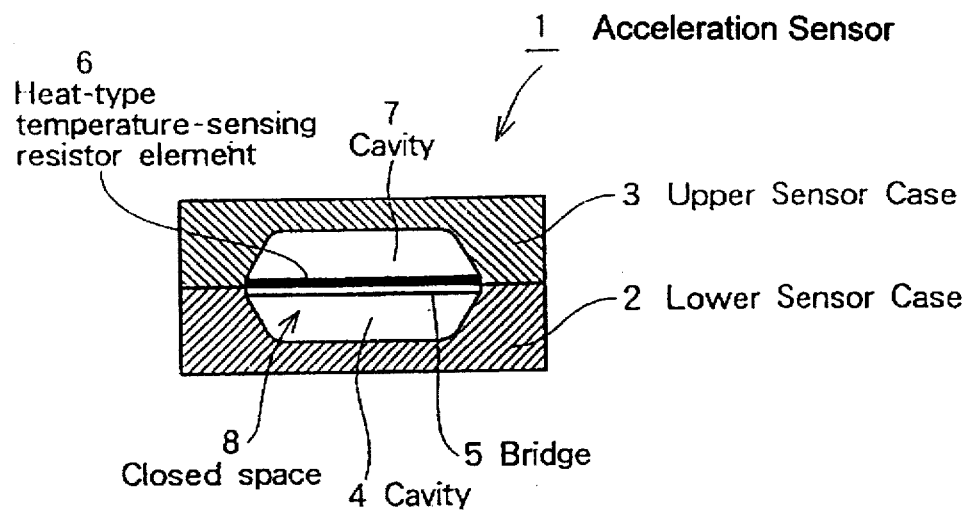
FIG. 1 is a cross-sectional view of a first embodiment of the acceleration sensor according to the present invention.
Figure 2:
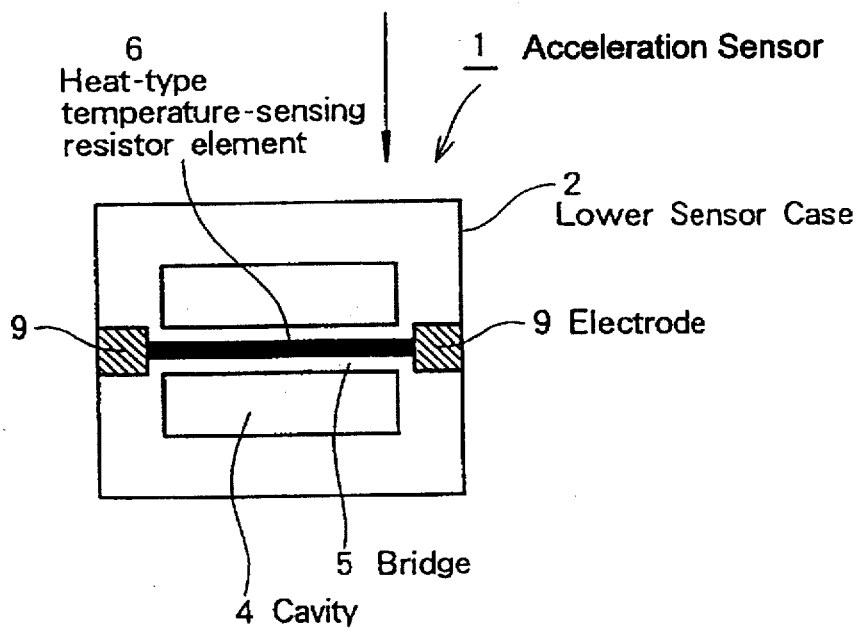
FIG. 2 is a plan view of a lower sensor case of the first embodiment of the acceleration sensor according to the present invention.

Preferred embodiments of the present invention will be explained in the following with reference to the attached drawings;

FIG. 1 is a cross-sectional view of a first embodiment of the acceleration sensor according to the present invention, and FIG. 2 is a plan view of a lower sensor case of the first embodiment of the acceleration sensor according to the present invention. They show the basic arrangement of the acceleration sensor according to the present invention.

Referring to FIGS. 1 and 2, an acceleration sensor 1 comprises a lower sensor case 2 formed therein with a cavity 4 and a bridge 5 by, for example, etching a semiconductor substrate with a fine-processing technique in the semiconductor manufacturing process, and an upper sensor case 3 formed therein with a cavity 7 by etching a semiconductor substrate, a closed space 8 being formed by joining the cases so that the cavities 4 and 7 face each other.

The closed space 8 is filled with an inert gas with a low heat transfer coefficient such as nitrogen or argon under pressure.

In addition, metal such as platinum is vapor-deposited on the surface of the bridge 5 of the lower sensor case 2, and etched to form a heat-type temperature-sensing resistor element 6 with a desired pattern.

The bridge 5 is formed to bridge the center of the cavity 4 of the lower sensor case 2. Etching and vapor evaporation are controlled to accurately position the heat-type temperature-sensing resistor element 6 at the center of the closed space 8 when the acceleration sensor 1 is constructed.

An electrode 9 formed by the same material as the heat-type temperature-sensing resistor element 6 is provided

4 on each end of the extension of the heat-type temperature-sensing resistor element 6 to electrically determine changes in the resistance of the heat-type temperature-sensing resistor element 6 which is caused by detecting the electrical supply from an external power supply and the action of acceleration (G).

For the acceleration sensor 1 thus constructed, a thermal equilibrium state with a steep temperature gradient is previously attained by heating the heat-type temperature-sensing resistor element 6 with the electrical supply from the external power supply through the electrodes 9.

In the thermal equilibrium state, when acceleration (G) (shown by the arrow in FIG. 2) acts on the acceleration sensor 1 in the direction perpendicular to the longitudinal direction of the heat-type temperature-sensing resistor element 6, a gas flow corresponding to the absolutes value of the acceleration (G) and its direction of action is generated in the closed space 8, which makes the temperature distribution in the closed space 8 unbalanced and lowers the surface temperature of the heat-type temperature-sensing resistor element 6.

Lowering of the surface temperature changes the resistance of the heat-type temperature-sensing resistor element 6 so that the absolute value of the acceleration (G) acting on the acceleration sensor 1 can be detected by electrically detecting the change in resistance.

As described above, in the acceleration sensor 1 according to the present invention, the sensor cases 2 and 3, the bridge 5, and the heat-type temperature-sensing resistor element 6 are formed by etching or vacuum evaporation with a fine-processing technique in the semiconductor manufacturing process so that a very small acceleration sensor several millimeters square can be constructed and so that the acceleration can be detected with a quick response and high accuracy.

Although the first embodiment has the sensor case constructed of a semiconductor substrate, it may also be constructed of an insulating substrate such as glass or ceramic.

In addition, the upper sensor case 3 is not limited to the semiconductor substrate, but may be constructed of glass or metal.

Furthermore, the lower sensor case 2 with the heat-type temperature-sensing resistor element 6 may be disposed in a closed space, in which case the upper sensor case 3 is not necessarily required.

In the following embodiments, it is also assumed that the sensor case, the bridge, the heater, the temperature-sensing resistor element, and the heat-type temperature-sensing resistor element are formed by using fine-processing technology of the semiconductor manufacturing process.

Figure 3:
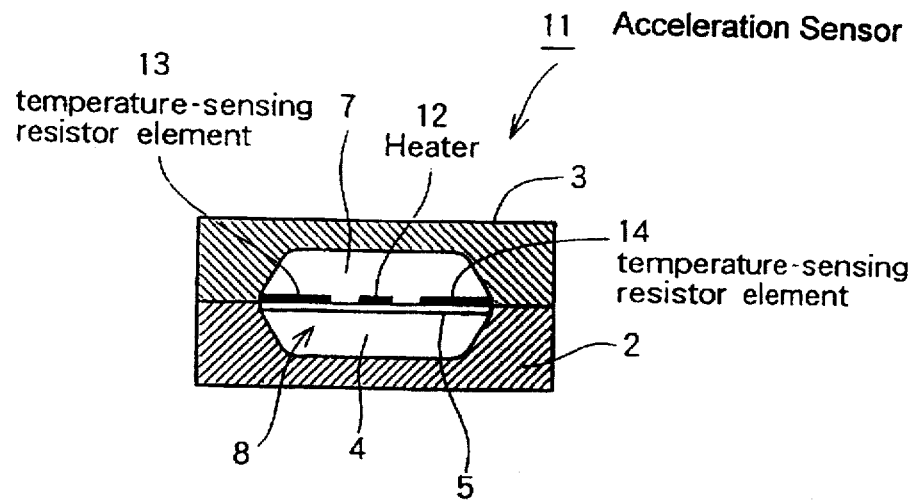
FIG. 3 is a cross-sectional view of a second embodiment of the acceleration sensor according to the present invention.
Figure 4:
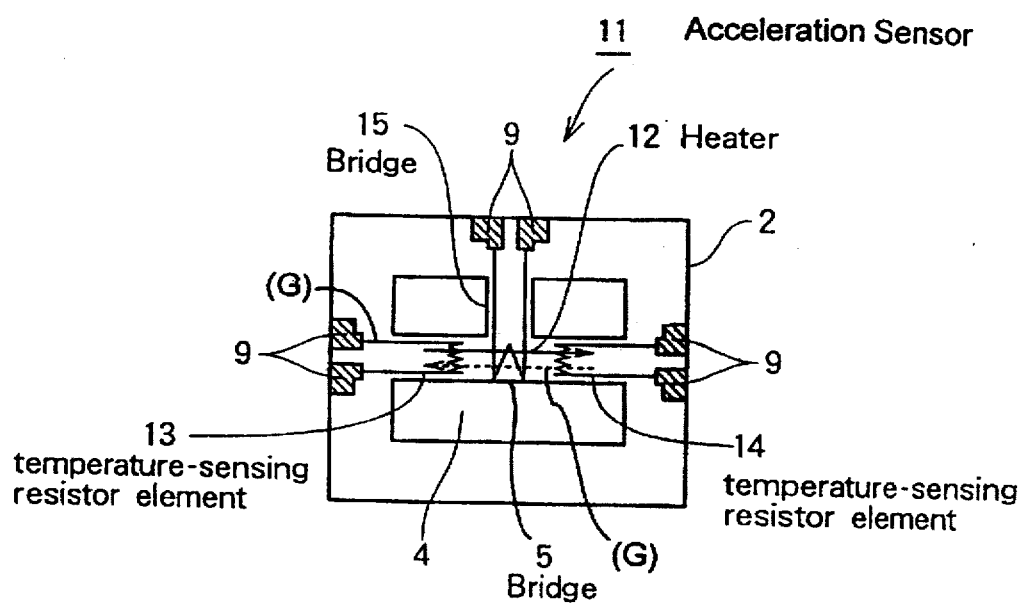
FIG. 4 is a plan view of a lower sensor case of the second embodiment of the acceleration sensor according to the present invention.

FIG. 3 is a cross-sectional view of a second embodiment of the acceleration sensor according to the present invention, while FIG. 4 is a plan view of a lower sensor case of the second embodiment of the acceleration sensor according to the present invention. They show an embodiment for detecting the absolute value and the direction of acceleration action (G) (shown by the arrows in FIG. 4) acting on the acceleration sensor.

Referring to FIGS. 3 and 4, an acceleration sensor 11 comprises a lower case 2 formed therein with a cavity 4 and bridges 5 and 15 by, for example, etching in a semiconductor substrate with a fine-processing technique in the semiconductor manufacturing process, and an upper sensor case 3 formed therein with a cavity 7 by etching a semiconductor substrate, a closed space 8 being formed by joining the cases so that the cavities 4 and 7 about each other.

Formed on the bridge 5 laying in the direction of acceleration action (G) are a heater 12 at the center of the bridge 5 in the longitudinal direction, temperature-sensing resistor elements 13, 14 opposite each other at a predetermined distance from the center of the bridge 5 in the longitudinal direction, and a lead pattern formed by using vacuum evaporation and etching of a fine-processing technique.

Moreover, the bridge 15 formed by placing it coplanar with and perpendicular to the bridge 5, and by depositing the same metal as the heater 12 on its surface, and etching it to form a lead pattern of the heater 12.

The pair of temperature-sensing resistor elements 13 and 14 is formed in such a manner that a metal pattern is formed by depositing high-melting-point metal such as Pt, Mo, Ni, Au, or Ti, and then etched to form a resistance temperature sensor with a pattern having a predetermined resistance.

When thermal stability and durability are required for the temperature-sensing resistor elements 13, 14, the surface of the temperature-sensing resistor elements 13, 14 formed by etching is coated by an oxide coating which is formed by an oxide of a material such as SiN.

The pair of temperature-sensing resistor elements 13, 14 and the heater 12 are connected through the lead pattern to respective electrodes 9 provided on the periphery of the lower sensor case 2, which electrodes 9 are then connected to an external power supply or a detector circuit.

In the acceleration sensor 11 thus constructed, the heater 12 is heated by supplying external power through two of the electrodes 9 to create a thermal equilibrium state with a steep temperature gradient in the closed space 8.

In the thermal equilibrium state where no acceleration (G) acts, the pair of temperature-sensing resistor elements 13 end 14 are in the same temperature atmosphere so that each of them exhibits the same resistance value if their resistance and characteristics of temperature coefficient are matched (paired).

When acceleration (G) acts in the equilibrium state in the direction shown in FIG. 4 (indicated by a solid arrow or broken arrow along bridge 5), a gas flow is generated in the inert gas, such as nitrogen or argon, enclosed in the closed space 8 to create a thermally unbalanced state in the direction of acceleration action (G) so that the temperature-sensing resistor elements 13 and 14 are subject to different temperatures, respectively.

Since the temperature-sensing resistor elements 13 and 14 generate opposite changes in resistance in the thermally unbalanced state, the absolute value and the direction of acceleration action (G) are detected by electrically detecting the change in resistance.

Figure 5:
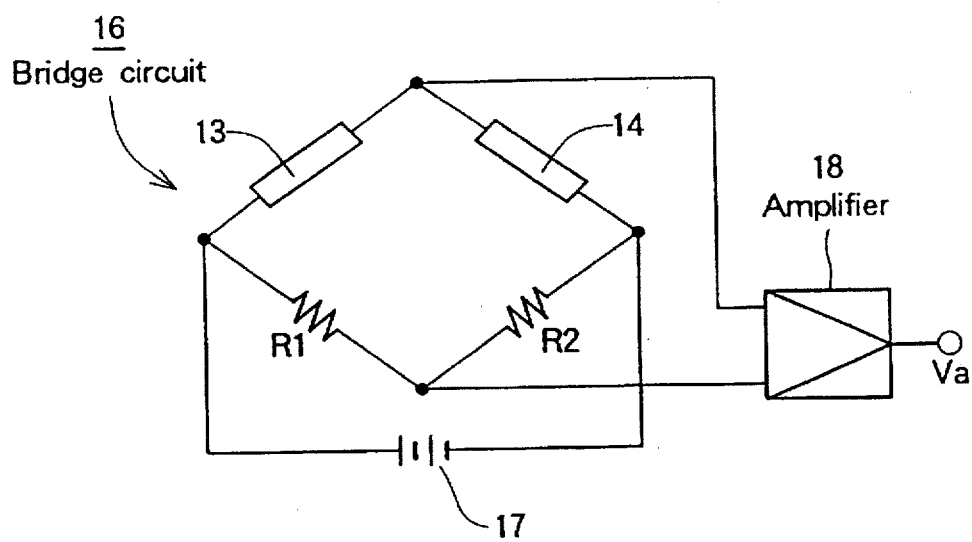
FIG. 5 is a circuit diagram of a detection circuit of the acceleration sensor of FIG. 4.

FIG. 5 shows the arrangement of a detection circuit of the acceleration sensor of FIG. 4.

Referring to FIG. 5, a detector circuit comprises a bridge circuit 16, a reference resistor R1, and a reference resistor R2, and an amplifier 18 which amplifies the differential output of the bridge circuit 16, wherein the bridge circuit 16 constitutes a resistor bridge by connecting the temperature-sensing resistor elements 13 and 14, which is externally provided through the electrodes 9, and reference resistors R1 and R2. A power supply 17 applies power to the bridge circuit 16.

When no acceleration (G) occurs, the bridge circuit 16 maintains the equilibrium state ($R_{x1}*R2=R_{x2}*R1$) because the temperature-sensing resistor elements 13 and 14 have the same resistance ($R_{x1}$, $R_{x2}$, $R_{x1}=R_{x2}$), and the bridge circuit 16 sets the reference resistors to the same resistance. Then, the bridge output (voltage) becomes zero so that the output $V_a$ of the amplifier 18 also becomes zero.

When acceleration (G) occurs, the temperature-sensing resistor elements 13 and 14 exhibit different resistance values ($R_{x1}>R_{x2}$ or $R_{x1}<R_{x2}$), and the bridge circuit 16 supplies to the amplifier 18 a bridge output (voltage) with negative (−) or positive (+) polarity, depending on the absolute value and the direction of acceleration action (G), and detects the output $V_a$ corresponding to the bridge output from the amplifier 18.

Because the temperature-sensing elements 13 and 14 are formed by a fine-processing technique of the semiconductor manufacturing process, it is possible to accurately provide resistance ($R_{x1}$, $R_{x2}$) in a paired state so that the offset of the bridge output (voltage) can be set to a value as close to zero as possible.

The acceleration sensor 11 employs nitrogen gas with a heat transfer coefficient of about 0.024 (kcal/m·h·°C.) as the gas enclosed in the closed space 8. When it is assumed that the heater 12 generates heat of about 0.01 (kcal/h) per square millimeter, the temperature gradient (=heat generation/heat transfer coefficient) for the heater 12 can be set to 400 (°C./mm) to make the temperature distribution in the closed space 8 steep so that acceleration in a very small space on a millimeter order can be detected with high sensitivity.

It is possible to further improve the sensitivity of acceleration detection by pressurizing the gas to be enclosed in the closed space 8 to pressure of more than one atmosphere.

As described, the acceleration sensor 11 can detect acceleration (G) acting on the acceleration sensor with high sensitivity because the closed space 8, the heater 12, and the temperature-sensing resistor elements 13 and 14 can be constructed by using a fine-processing technique of the semiconductor manufacturing process, and their positions can be precisely determined so that a very small acceleration sensor on a millimeter order can be easily obtained.

In addition, the acceleration sensor 11 separately provides the heater 12 and the temperature-sensing resistor elements 13 and 14, which are positioned opposite to the direction to which acceleration (G) occurs, so that the absolute value and the direction of acceleration (G) acting on the acceleration sensor can be detected with high accuracy.

If the acceleration sensor is constructed without using the fine-processing technique of the semiconductor manufacturing process as in the conventional sensor, the ability to reduce its size as limited, and the positioning accuracy of the heater and the temperature-sensing resistor elements in the closed space and the pairing of temperature-sensing resistor elements cannot be fully satisfied, with the result that the sensitivity and accuracy in the detection of acceleration (G) are deteriorated.

Figure 6:
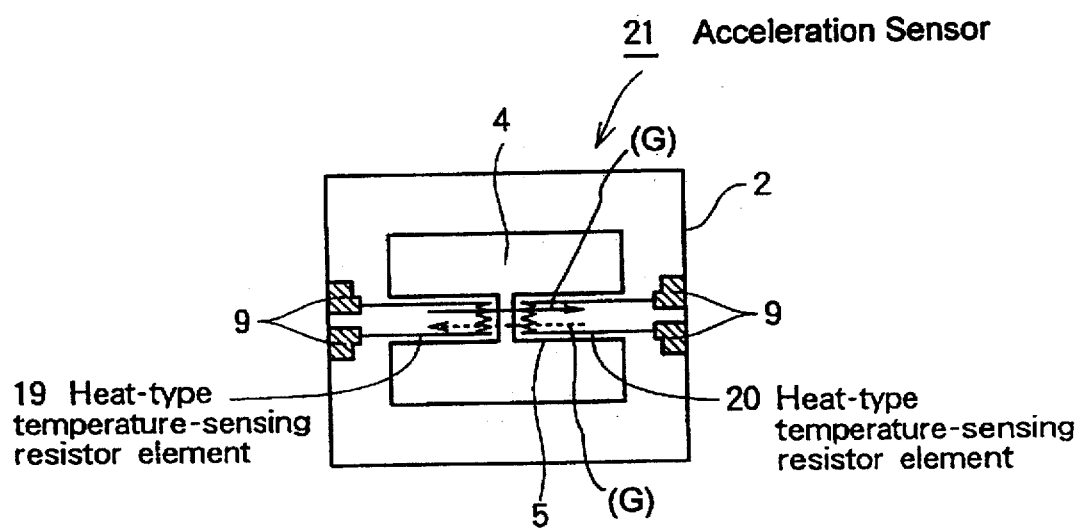
FIG. 6 is a plan view of a lower sensor case of a third embodiment of the acceleration sensor according to the present invention.

FIG. 6 shows a plan view of a lower sensor case of a third embodiment of the acceleration sensor according to the present invention.

Referring to FIG. 6, an acceleration sensor 21 differs from the acceleration sensor 11 of FIG. 4 in that, in place of the temperature-sensing resistor elements 13 and 14, heat-type temperature-sensing resistor elements 19 and 20 are positioned opposite to each other to eliminate the heater 12 and the bridge 15.

Because the heat-type temperature-sensing resistor elements 19 and 20 themselves serve as both heaters and temperature-sensing resistor elements, it is possible to create a thermal equilibrium state in temperature distribution with two heaters, and to detect an unbalanced state in the temperature distribution caused by the action of acceleration (G) (shown by the arrows in FIG. 6) with two temperature-sensing resistor elements.

Figure 7:
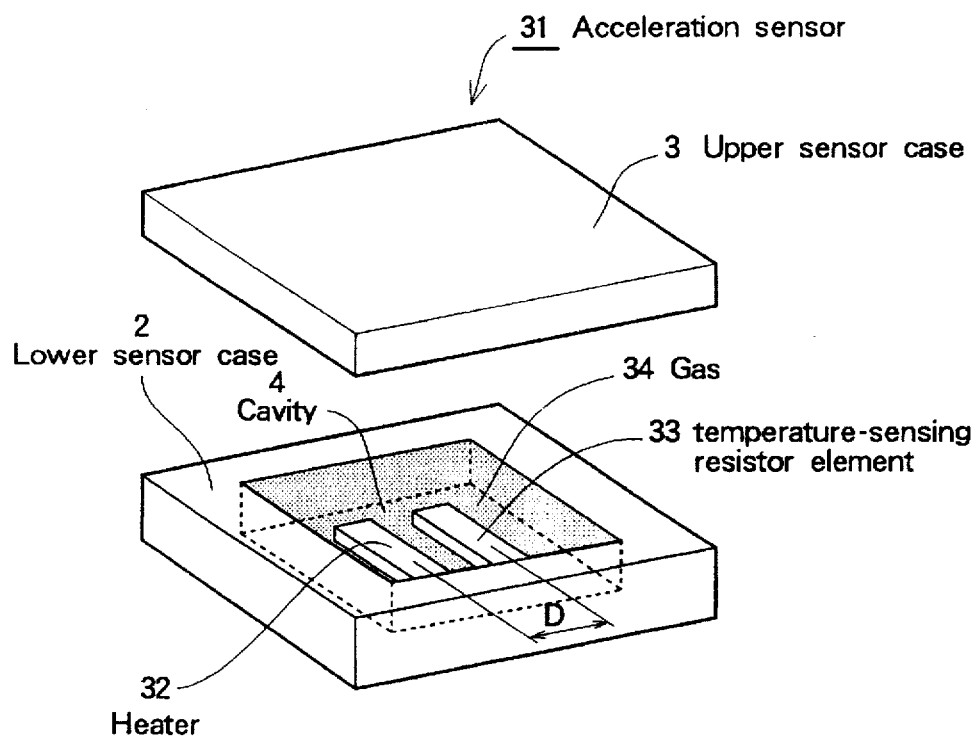
FIGS. 7 and 8 are an exploded perspective view and plan view, respectively, of the arrangement of a fourth embodiment of the acceleration sensor according to the present invention.
Figure 8:
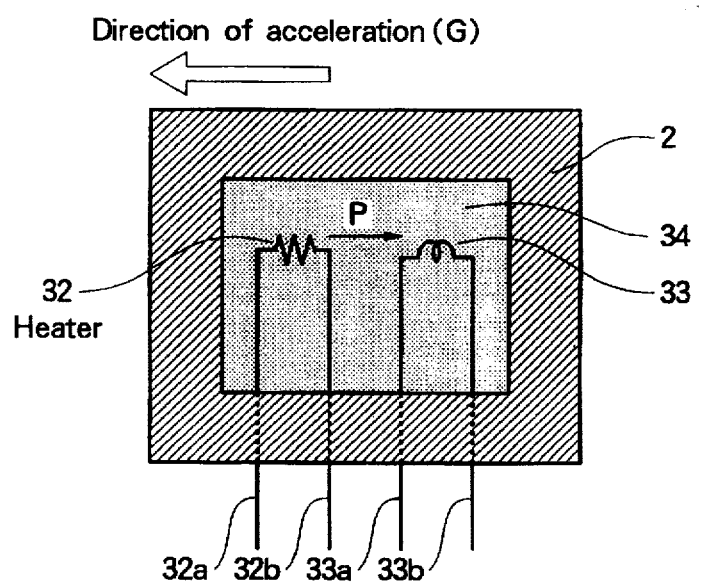

FIGS. 7 and 8 are views of the arrangement of a fourth embodiment of the acceleration sensor according to the present invention.

Referring to FIGS. 7 and 8, an acceleration sensor 21 comprises an upper sensor case 3 formed therein with a cavity (not shown), a lower sensor case 2 having a cavity 4, a heater 32, and a temperature-sensing resistor element 33, the latter two components being provided on a bridge formed in the cavity 4. A gas 34 is enclosed in a closed space formed by the upper and lower cavities.

The heater 32 and the temperature-securing resistor element 33 are resistors which are formed by depositing and etching platinum or tungsten on a bridge (not shown). The gas 34 is a pressurized gas with a low heat transfer coefficient such as nitrogen gas or argon. The lower sensor case 2 and the upper sensor case 3 are closely attached and joined.

The heater 32 is driven by an external power supply through lead wires 32a and 32b, and generates a temperature sufficiently higher than the ambient temperature.

In addition, the temperature-sensing resistor 33 is previously adjusted to have a predetermined resistance value by supplying a small current from the external power supply through lead wires 33a and 33b.

The heat generated from the heater 32 is transferred through the gas 34 to create a temperature distribution corresponding to the distance from the heater 32.

Moreover, use of a pressurized gas with a low heat transfer coefficient such as nitrogen gas or argon creates temperature distribution with a steep temperature gradient corresponding to the distance from the heater 32.

When acceleration (G) acts in the direction indicated by an arrow (G) shown in FIG. 8 (to the left) under a stable temperature distribution in the closed space, the heated gas 34 moves in the direction of arrow P (to the right) to raise the temperature of the temperature-sensing resistor element 33.

As the temperature of the temperature-sensing resistor element 33 is raised, the resistance also rises, if the temperature coefficient is positive, to increase the value of the voltage to be detected on the lead wires 33a and 33b.

On the contrary, if acceleration (G) acts in the opposite direction (to the right), the heated gas 34 moves to the left to reduce the temperature of the temperature-sensing resistor element 33 and also to lower the resistance value of the temperature-sensing resistor element 33 so that the value of the voltage to be detected on the lead wires 33a and 33b is reduced.

The heater 32 and the temperature-sensing resistor element 33 are positioned on a bridge (not shown) at a predetermined distance D.

As described, since the acceleration sensor 31 is constructed by positioning the heater 32 and the temperature-sensing resistor element 33, enclosing the pressurized gas with a low heat transfer coefficient such as nitrogen gas or argon in the closed space to increase the temperature gradient and to detect the temperature with a steep temperature gradient from the heater 32, it can detect the temperature change from the change of acceleration (G) with high accuracy.

Figure 9:
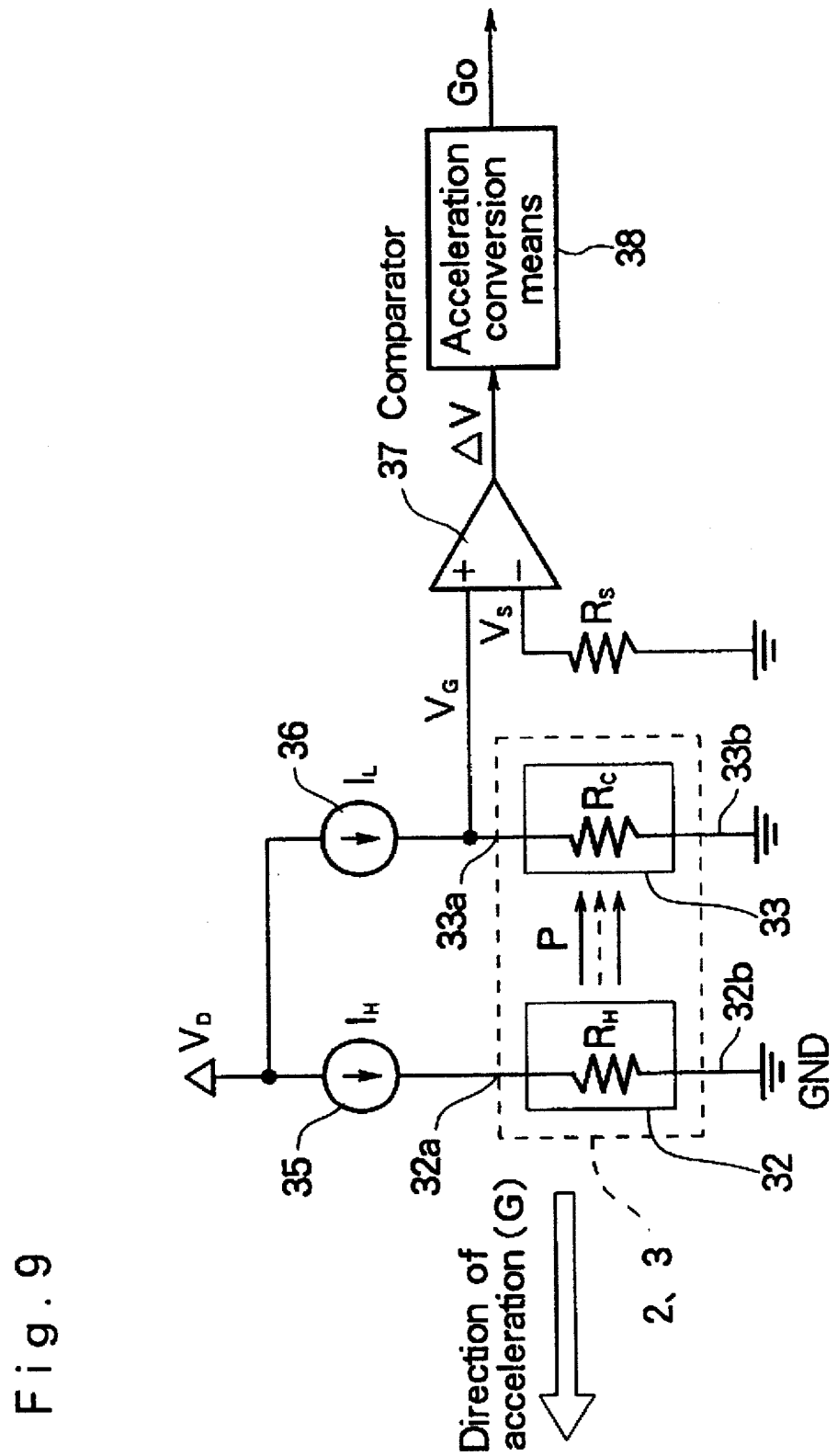
FIG. 9 is a functional block diagram for the detection of acceleration by using the acceleration sensor of FIGS. 7 and 8.

FIG. 9 shows a functional block diagram for the detection of acceleration by using the acceleration sensor of FIGS. 7 and 8.

Referring to FIG. 9, the heater 32 is driven by a constant current source ($I_H$) 35, and generates heat at a high temperature corresponding to the power ($R_H*I_H^2$) based on the resistance $R_H$ of heater 32 and the current $I_H$.

In addition, the temperature-sensing resistor element 33 is driven by a constant current source ($I_L$) 36, set to a resistance value $R_c$ which is the sum of a resistance value at the ordinary temperature and a resistance value corresponding to the temperature transferred from the heater 32, and outputs the voltage at a value $V_C$ ($R_C*I_L$).

the voltage $V_C$ is an output of the acceleration sensor 31 corresponding to the resistance $R_C$ when no acceleration (G) acts, and input to one terminal (for example, the positive input terminal) of a comparator 37 which is constituted by, for example, an operational amplifier.

The other terminal (for example, a negative input terminal) of the comparator 37 is input with a voltage $V_S$ from a reference resistor $R_S$. The voltage $V_C$ is set to be equal to the voltage $V_S$ ($V_C=V_S$), for example, when no acceleration (G) occurs.

The comparator 37 calculates and outputs the difference $\Delta V$ between the voltage $V_C$ and the voltage $V_s(=V_C-V_S)$. Therefore, the difference $\Delta V$ is zero when no acceleration (G) occurs.

When the acceleration (G) occurs in the direction shown by an arrow (G) in the figure, heat transfer is generated from the heater 32 to the temperature-sensing resistor element 33 so that the resistance $R_C$ of the temperature-sensing resistor element 33 increases, and the difference $\Delta V$ exceeds zero ($\Delta V>0$) to provide a positive voltage.

On the contrary, when the acceleration (G) occurs in the direction opposite to that shown in the figure, the resistance $R_C$ of the temperature-sensing resistor element 33 decreases, and the difference $\Delta V$ becomes less than zero ($\Delta V<0$) to provide a negative voltage.

An acceleration conversion means 38 has a memory such as a ROM which stores, beforehand, a value of the acceleration $G_0$ corresponding to the difference $\Delta V$, and is arranged to output an acceleration signal $G_0$ in response to the input of the difference $\Delta V$.

As described above, the acceleration sensor 31 according to the present invention comprises the heater which heats the gas to create a temperature distribution in the space, and the temperature-sensing resistor element which, when acceleration acts on the sensor case, detects a temperature change from the movement of the gas with the temperature distribution so that it can detect the absolute value and the direction of acceleration action. In addition, because the temperature-sensing resistor element is positioned at a predetermined distance from the heater to detect a temperature lower than that of the heater, the acceleration sensor can maintain stable sensitivity while preventing the deterioration or aging which may be caused by high temperature.

Furthermore, the acceleration sensor 31 according to the present invention employs a pressurized gas with a low heat transfer coefficient as the gas to be enclosed, and can heighten the sensitivity to the temperature detected with the steep temperature gradient so that the acceleration corresponding to the detected temperature can be detected with high accuracy.

FIGS. 10 and 11 are views of the arrangement of a fifth embodiment of the acceleration sensor according to the present invention.

Referring to FIGS. 10 and 11, an acceleration sensor 41 differs from the acceleration sensor 31 shown in FIGS. 7 and 8 in that a temperature-sensing resistor element 42 for temperature compensation is disposed in a cavity 44 formed in a lower sensor case 2 or outside the lower sensor case 2.

The cavity 44 is formed separately from a cavity 43 to avoid the influence of the heat from the heater 32. Gas is enclosed in the closed space of cavity 44 so that the temperature-sensing resistor element 42 for temperature compensation detects the ambient temperature.

When the temperature-sensing resistor element 42 for temperature compensation is arranged on a bridge in the cavity 44, it is formed on the same semiconductor substrate as for the heater 32 and the temperature-sensing resistor element 33 by using a fine-processing technique of the semiconductor manufacturing process.

As the temperature-sensing resistor element 42 for temperature compensation and the temperature-sensing resistor element 33 are formed on the same semiconductor substrate with the same semiconductor manufacturing process, temperature-sensing resistor elements with the same characteristics can be formed so that variations in the characteristics and aging between both temperature-sensing resistor elements can be compensated for.

When the temperature-sensing resistor element 42 for temperature compensation is disposed outside the lower sensor case 2 (the upper sensor case 3 being included), it is attained by attaching, for example, by bonding, to the case the temperature-sensing resistor element 42 for temperature compensation with temperature characteristics matching those of the temperature-sensing resistor element 33.

When left for a sufficient period of time in a predetermined ambient temperature without supplying current to the heater 32, the heater 32, the temperature-sensing resistor element 33, and the temperature-sensing resistor element 42 for temperature compensation are set to the ambient temperature.

In such state, when current is supplied to the heater 32, the heater 32 generates heat corresponding to the power consumption determined by the supplied current and resistance, and thus is heated. It has a temperature equal to the sum of the temperature from the consumed power and the ambient temperature.

The heat generated from the heater 32 is transferred to the gas 34 such as nitrogen gas or argon to create a temperature distribution with a steep temperature gradient, which is detected by the temperature-sensing resistor element 33. Since the gas 34 and the temperature-sensing resistor element 33 are previously set to the ambient temperature, the temperature detected by the temperature-sensing resistor 33 is also the sum of the temperature transferred from the heater 32 and the ambient temperature.

For example, if the reference ambient temperature is 20° C., and the ambient temperature is higher than 20° C. by a predetermined temperature $\Delta T$, the temperature of the heater 32 is the temperature from the consumed power added to the predetermined temperature $\Delta T$, and the temperature detected by the temperature-sensing resistor element 33 is also the temperature of temperature distribution at the location where the temperature-sensing resistor element 33 is positioned added to the predetermined temperature $\Delta T$.

In addition, because the temperature-sensing resistor element 42 for temperature compensation is also set to the ambient temperature (the reference temperature 20° C. plus the predetermined temperature $\Delta T$), it is possible to compensate for the temperature detected by the temperature-sensing resistor element 33 based on the temperature detected by the temperature-sensing resistor element 42 for temperature compensation.

Likewise, also, when heat movement is generated by the movement of the gas 34 in the closed space formed by the cavity 43 under the action of acceleration (G), temperature compensation can be attained based on the temperature detected by the temperature-sensing resistor element 42 for temperature compensation.

FIG. 12 shows a functional block diagram for the detection of acceleration by using the acceleration sensor of FIGS. 10 and 11.

Referring to FIG. 12, the heater 32 and the temperature-sensing resistor element 33 are driven by a constant-current source $(I_H)$ 35 and a constant-current source $(I_L)$ 36, respectively, and the temperature-sensing resistor element 42 for temperature compensation is driven by a constant-current source $(I_L)$ 45 with the same current as that for the temperature-sensing resistor element 33.

When the heater 32 is not driven $(I_H=0)$, the temperature-sensing resistor element 33 and the temperature-sensing resistor element 42 for temperature compensation detect the ambient temperature. Because the same temperature characteristics are arranged to be provided for both temperature-sensing resistor elements, the resistance $R_C$ is equal to the resistance $R_F$, and the detection outputs (voltage) $V_C$ and $V_R$ from the temperature-sensing resistor element 33 and the temperature-sensing resistor element 42 for temperature compensation become equal $(V_C=V_R)$.

On the contrary, when the heater 32 is driven by the current source $(I_R)$, the rise in temperature from the heater 32 is detected, and the resistance $R_C$ of the temperature-sensing resistor element 33 is increased $(R_C>R_F)$ so that the detection output (voltage) $V_C$ is also increased $(V_C>V_R)$.

An acceleration correction means 46 comprising a temperature comparator 47, a correction value output means 48, and a correction value memory 49, corrects the detection output $V_C$ from the temperature-sensing resistor element 33 based on the detection output $V_R$ from the temperature-sensing resistor element 42 for temperature compensation to compensate for the variation in the acceleration (G) due to the ambient temperature, and detects the actual acceleration $G_O$ acting on the acceleration sensor.

The temperature comparator 47 consists of a comparator circuit such as a comparator, and stores, beforehand, the detection output $V_R$ provided by the temperature-sensing resistor element 42 for temperature compensation. It compares the detection output $V_H$ with the reference voltage $V_f$ corresponding to 20° C., and outputs the difference $\Delta V_R$ between the detection output $V_H$ and the reference voltage $V_f$ to the correction value output means 48.

The correction value output means 48 determines the detection output $V_C$ from the temperature-sensing resistor element 33 and the difference $\Delta V_R$, reads an acceleration correction value $\Delta G$ corresponding to the detection output $V_C$ and the difference $\Delta V_H$ from the correction value memory 49, and provides it to the acceleration conversion means 38.

The correction value output means 48 is set to make the acceleration correction value $\Delta G$ to be output as zero when no acceleration (G) acts at an ambient temperature of, for example, 20° C.

The correction value memory 49 consists of a memory such as a ROM and sets, in a table, a correction value $\Delta G$ when the difference $\Delta V_R$ changes, which correction value is previously determined through experiments for a reference of a difference $(V_C-\Delta V_R)$ between the detection output $V_R$ and the difference $\Delta V_R$ based on the detection output $V_R$ and the difference $\Delta V_R$.

The acceleration conversion means 38 comprises a memory such as a ROM for converting the detection output $V_C$ to corresponding acceleration $G_O$, and a subtractor, converts the detection output $V_C$ to acceleration $G_O$, the calculates the difference ($G_O$–$\Delta G$) of the correction value $\Delta G$ from the acceleration $G_O$, and outputs the difference as the acceleration $G_O$.

The acceleration conversion means 38 is set to make the acceleration $G_O$ to be output to zero when no acceleration (G) acts at an ambient temperature of, for example, 20° C.

Thus, as the acceleration $G_O$ to be output is set to zero when no acceleration (G) acts at an ambient temperature of 20° C., and the acceleration correction means 46 compensates for the temperature according to the change in the ambient temperature, it is possible to set the acceleration $G_O$ output from the acceleration conversion means 38 always to zero.

When acceleration (G) acts, as the detection voltage $V_C$ of the temperature-sensing resistor element 33 increases or decreases, the acceleration $G_O$ corresponding to the detection output $V_C$ and corrected for the acceleration with respect to the ambient temperature (correction value $\Delta G$) can be obtained from the acceleration conversion means 38.

The acceleration correction means 46 is an embodiment of an arrangement assuming a case where the ambient temperature changes from the temperature detected at a state where the temperature-sensing resistor element 33 is at the ambient temperature of 20° C. and no acceleration (G) occurs, and where the output $G_O$ from the acceleration conversion means 38 corresponding to the detection output $V_C$ is nonlinear.

FIG. 13 shows another embodiment of the acceleration correction means in FIG. 12.

This embodiment represents a case in which the output $G_O$ from the acceleration conversion means 50 and the detection output $V_{CC}$ from the acceleration correction means 49 are linear.

The acceleration correction means 49 comprises a comparator circuit such as a comparator and an arithmetic circuit such as a subtractor, and calculates and outputs a difference $V_{CC}$ ($V_C$–$V_R$) between the detection output $V_C$ from the temperature-sensing resistor element 33 and the detection output $V_R$ from the temperature-sensing resistor element 42 for temperature compensation.

The acceleration conversion means 50 has a memory such as a ROM for converting the difference output $V_{CC}$ from the acceleration correction means 49 in to a corresponding acceleration $G_O$, converts the difference output $V_{CC}$ into acceleration $G_O$, and outputs it.

As described above, since the acceleration sensor 41 according to the present invention comprises the temperature-sensing resistor element 42 for temperature compensation for detecting the ambient temperature, and the acceleration correction means for correcting the output signal output from the temperature-sensing resistor element 33 based on the output signal from the temperature-sensing resistor element 42 for temperature compensation, it can detect the accurately acting acceleration by compensating for the influence from the ambient temperature.

FIGS. 14 and 15 are views of the arrangement of a sixth embodiment of the acceleration sensor according to the present invention.

Referring to FIGS. 14 and 15, an acceleration sensor 51 comprises an upper sensor case 3 formed therein with a cavity (not shown), a lower sensor case 2 having a cavity 4, a temperature-sensing resistor elements 52 and 53 provided on a bridge (not shown) in the cavity 4, and a pair of reference resistors 54 and 55 externally connected to the temperature-sensing resistor elements 52 and 53 to form a bridge circuit 56, a gas 34 being enclosed in a closed space formed by the upper and lower sensor cases.

The pair of the heat-type temperature-sensing resistor elements 52 and 53 comprises resistors, each of which is formed by depositing and etching platinum or tungsten on a bridge (not shown). The gas 34 employed is a pressurized gas with a low heat transfer coefficient such as nitrogen gas or argon. The lower sensor case 2 and the upper sensor case 3 are closely attached and joined.

In addition, the pair of the heat-type temperature-sensing resistor elements 52 (resistor R1) and 53 (resistor R2) are connected by lead wires which lead to outside of the sensor case for connecting to the reference resistors 54 (resistor r1) and 55 (resistor r2), which are disposed outside the sensor case, to form a bridge circuit 56. The bridge circuit 56 has terminals (56a–56d), as shown in FIG. 15, and consists of four resistors.

When power (for example, from a power supply $V_1$ shown in FIG. 16) is applied across the terminals (56a–56b), the heat-type temperature-sensing resistor elements 52 and 53 generate heat corresponding to the power consumed, and generate, as a heat source with a temperature sufficiently higher than the ambient temperature, a temperature distribution corresponding to the distance between the heat-type temperature-sensing resistor elements 52 and 53 in the closed space.

In this state, the heat-type temperature-sensing resistor elements 52 and 53 have resistances R1 and R2, respectively, so that voltage $V_X$ divided by the resistances R1 and R2 is generated at the terminal (56c).

In contrast, voltage $V_Y$ divided by resistances r1 and r2 of the reference resistors 54 and 55 is generated at the terminal (56d). Thus, resistances R1, R2, r1 and r2 are set in such a manner that the output of the bridge circuit 56 (potential difference $V_X$–$V_Y$) is in the equilibrium state (output voltage=0V) when no acceleration (G) occurs (R1=R2, r1=r2).

In this state, the temperature distribution in the closed space caused by heat generated from the heat-type temperature-sensing resistor elements 52 and 53 is also in the equilibrium state.

In addition, the employment of a pressurized gas with a low heat transfer coefficient, such as nitrogen gas or argon, as the gas 34 results in a temperature distribution corresponding to the distance between the heat-type temperature-sensing resistor elements 52 and 53 in the closed space with a steep temperature gradient.

When acceleration (G) acts in the direction indicated by the arrow (G) shown in FIG. 15 in the equilibrium state, the gas 34 moves in the direction of P to cause heat movement from the heat-type temperature-sensing resistor element 52 to the heat-type temperature-sensing resistor element 53.

When the heat movement (direction of P) occurs, the thermal equilibrium in the closed space is destroyed, the temperature of the heat-type temperature-sensing resistor element 52 decreases, and the temperature of the heat-type temperature-sensing resistor element 53 increases so that the resistance R1 of the heat-type temperature-sensing resistor element 52 decreases and the resistance R2 of the heat-type temperature-sensing resistor element 53 increases.

When, with the occurrence of acceleration (G), the resistance R2 increases and the resistance R1 decreases, the output of the bridge circuit 56 also becomes unbalanced so that the potential difference $V_X-V_Y$ detects a positive value ($V_X-V_Y>0$) corresponding to the acceleration (G).

In contrast, when acceleration (G) acts in the direction opposite to the arrow (G) shown in FIG. 15, a reverse phenomenon occurs, that is, the resistance R1 increases and the resistance R2 decreases so that the output of the bridge circuit 56 detects a negative potential value ($V_X-V_Y<0$) corresponding to the acceleration (G).

Thus, the acceleration sensor 51 detects the magnitude of the acting acceleration (G) with the absolute value of the output of the bridge circuit 56 (potential difference $V_X-V_Y$), and the acting direction of acceleration (G) with the sign of the output (positive or negative of potential difference $V_X-V_Y$).

The output of the bridge circuit 56 (potential difference $V_X-V_Y$) will be explained in the following:

FIG. 16 shows a bridge circuit diagram of the acceleration sensor of FIGS. 14 and 15.

Referring to FIG. 16, the bridge circuit 56 consists of the resistances R1 and R2 of the heat-type temperature-sensing resistor elements 52 and 53, the resistances r1 and r2 of the reference resistors 54 and 55, and a power supply (for example, the voltage source $V_1$) being connected between the terminals (56a–56b), with the output occurring across the terminals (56c–56d).

The voltage $V_X$ at the terminal (56c) and the voltage $V_Y$ at the terminal (56d) with respect to ground (GND) is calculated by using equation 1, as follows:

$$V_X = R2 \cdot V_1/(R1+R2), \text{ and } V_Y = r2 \cdot V_1/(r1+r2) \quad (1)$$

Based on equation 1, the output potential difference of the bridge circuit 56 $V_O(=V_X-V_Y)$ can be represented by the following, equation 2:

$$\begin{aligned}V_0 &= V_X - V_Y \\ &= (R2 \cdot r1 - R1 \cdot r2)V_1/\{(R1+R2) \cdot (r1+r2)\}\end{aligned} \quad (2)$$

In equation 2, by setting R1=R2 and r1=r2, the output potential difference $V_O=0$ can be obtained in the equilibrium state where no acceleration (G) occurs.

When, in the equilibrium state, the acceleration (G) shown in FIG. 15 occurs, and the heat movement (direction of arrow P) causes a decrease in the resistance R1 by $\Delta R$ and an increase in the resistance R2 by $\Delta R$, the output potential difference $V_O(=V_X-V_Y)$ becomes the value represented by $$\begin{aligned}V_0 &= V_X - V_Y \\ &= \Delta R \cdot (r1+r2)V_1/\{(R1+R2) \cdot (r1+r2)\} \\ &= \Delta R \cdot V_1/2R\end{aligned} \quad (3)$$

Thus, the output potential difference $V_C$ can provide a value proportional to the variation $\Delta R$ of resistance corresponding to acceleration (G).

However, when acceleration (G) acts in a direction opposite to that shown in FIG. 15, the output potential difference $V_C$ provides a value with the opposite sign to equation 3 ($-\Delta R \cdot V_1/2R$).

As described above, because in the acceleration sensor 51 according to this embodiment, a pair of heat-type temperature-sensing resistor elements is disposed with a predetermined distance in a closed space containing a pressurized gas with a low heat transfer coefficient, and a bridge circuit is constituted by a pair of heat-type temperature-sensing resistor elements and a pair of external reference resistors, it is possible to detect heat movement in the sensor case, which is caused by the action of acceleration, with the change in resistance of the pair of heat-type temperature-sensing resistor elements, to detect the absolute value of acceleration at a high accuracy with the output voltage of the bridge circuit and its sign, and to detect the direction in which acceleration is acting.

FIGS. 17 and 18 are views of the arrangement of a seventh embodiment of the acceleration sensor according to the present invention.

Referring to FIGS. 17 and 18, the acceleration sensor 61 differs from the acceleration sensor 51 shown in FIG. 14 in that heat-type temperature-sensing resistor elements 62 and 63 are disposed at a predetermined distance D in a closed space in a lower sensor case 2, and a plurality of heaters 64 ($R_{11}-R_{1n}$, $R_{21}-R_{2n}$, $R_{31}-R_{3n}$) are positioned on both sides of the heat-type temperature-sensing resistor elements 62 and 63.

Furthermore, similar to the embodiment of FIG. 15, the heat-type temperature-sensing resistor elements 62 and 63, and the reference resistors 54 and 55 constitute the bridge circuit 56 shown in FIG. 15.

The heaters 64 ($R_{11}-R_{1n}$, $R_{21}-R_{2n}$, $R_{31}-R_{3n}$) are heated by, for example, connecting the elements in series and connecting a power supply across the terminals (56e–56f).

In addition, as in the embodiment of FIG. 16, a voltage source $V_1$ is connected across the terminals (56a–56b) of the bridge circuit 56 to heat the heat-type temperature-sensing resistor elements 62 and 63.

It is assumed that the heat-type temperature-sensing resistor elements 62 and 63 have resistances R1 and R2 that are equal when the temperature distribution in the closed space caused by the heat generation of the heat-type temperature-sensing resistor elements 62 and 63, and the heaters 64 ($R_{11}-R_{1n}$, $R_{21}-R_{2n}$, $R_{31}-R_{3n}$) reaches equilibrium. Then, the bridge circuit 56 constituted by resistances r1 and r2 of the standard resistors 54 and 55, and resistances R1 and R2 is set in that state in which its output (output potential difference $V_o$) is in an equilibrium state ($V_x-V_y=0$).

When heat movement is generated in the closed space in the direction of the arrow (direction of arrow P) by the action of acceleration (G) in the direction arrow (G) shown in FIG. 18, heat moves from the heat-type temperature-sensing resistor element 62 to the heat-type temperature-sensing resistor element 63 as described for FIG. 15 to decrease the resistance R1 and to increase the resistance R2.

Since the decrease in the resistance R1 and the increase in the resistance R2 provide a value larger than the variation in FIG. 15 (for example, $k \cdot \Delta R$) because of the heat movement in the heaters 64 ($R_{11}-R_{1n}$, $R_{21}-R_{2n}$, $R_{31}-R_{3n}$), the bridge output $V_o$ ($V_X-V_Y$) becomes $k \cdot \Delta R \cdot V_1/2R$ times the relationship of equations 1–3.

Thus, because of the acceleration sensor 61 is provided with a plurality of heaters 64, the movement of heat (temperature change) can be set at a linear value, and a larger bridge output than that of the arrangement of FIG. 14 can be obtained for the sense acceleration (G) so that the detection accuracy can be improved.

In contrast, when the direction of acceleration (G) is reversed, the bridge output $V_o$ of $-k \cdot \Delta R \cdot V_1/2R$ is obtained.

It is preferred as in the arrangement of FIG. 14, to employ a pressurized gas with a low heat transfer coefficient such as nitrogen gas or argon as the gas 34 used.

As described, since the acceleration sensor 61 according to this embodiment provides a plurality of heaters together with a pair of heat-type temperature-sensing resistor elements in the closed space, the heat movement (temperature change) in the closed space can be increased so that the absolute value of acceleration can be detected with a high accuracy.

FIGS. 19 and 20 are views of the arrangement of a eighth embodiment of acceleration sensor according to the present invention.

Referring to FIGS. 19 and 20, an acceleration sensor 71 differs from the arrangements shown in FIGS. 14 and 15 in that heat-type temperature-sensing resistor elements 74 and 75 corresponding to the standard resistor (r1) 54 and the standard resistor (r2) 55 shown in FIG. 15 are provided in the closed space in the lower sensor case 2 together with the heat-type temperature-sensing resistor elements 72 and 73, and in that a bridge circuit 56 is constituted by the heat-type temperature-sensing resistors elements 72, 73, 74 and 75.

A power supply $V_1$ is connected across the terminals (56a-56b) to heat the type-type temperature-sensing resistor elements 72, 73, 74, and 75. The resistances R1, R2, r2, and r1 are set to values to cause equilibrium ($V_x-V_y=0$) of the output $V_o$ (across the terminals 56c-56b) of the thermally balanced bridge circuit 56 in the closed space.

When the movement of heat is generated in the closed space as acceleration (G) acts in the direction of the arrow (direction of P), heat moves from the heat-type temperature-sensing resistor elements 72 and 74 to the heat-type temperature-sensing resistor elements 73 and 75 to decrease the resistances R1 and r2 and to increase the resistances R2 and r1.

When it is assumed that the decrease in the resistances R1 and r2 is $-\Delta R$ and $-\Delta r$, and the increase in the resistances R2 and r1 is $\Delta R$ and $\Delta r$, the bridge output $V_o$ ($V_x-V_y$) is represented by equation 4:

$$V_0 = V_X - V_Y \qquad (4)$$
$$= (R^*\Delta r + r^*\Delta R)V_1/(2R^*r)$$

Thus, the acceleration sensor 71 provided with the heat-type temperature-sensing resistor elements 74 and 75 can set the movement of heat (temperature change) to a large value, and a larger bridge output can be obtained for the same acceleration (G) than for the arrangements of FIGS. 14 and 15 so that the detection accuracy of the sensor can be increased.

It is preferred as in the arrangement of FIG. 14, to employ a pressurized gas with a low heat transfer coefficient such as nitrogen gas or argon as the gas 34 used, and to position the heat-type temperature-sensing resistor elements 72 and 73 at a relative distance D.

As described above, since in the acceleration sensor 71 according to this embodiment, two pairs of heat-type temperature-sensing resistor elements are provided in the closed space, and the bridge circuit is constituted by four heat-type temperature-sensing resistor elements, the absolute value of acceleration can be detected at a higher accuracy.

FIG. 21 is an exploded perspective view of the arrangement of essential components of a ninth embodiment of an acceleration sensor according to the present invention.

Referring to FIG. 21, an acceleration sensor 81 is an embodiment of a three-axis acceleration sensor, and is constituted by four types of semiconductor substrates 82–85.

The semiconductor substrates 82–85 are formed therein with a cavity, a closed space, heaters, and temperature-sensing resistor elements by a fine-processing technique in the semiconductor manufacturing process such as etching or depositing.

Dimensions and placement of the closed space, the heaters, the temperature-sensing elements, and external connection pads can be very finely determined by a mask so that they can be attained with a high accuracy.

The semiconductor substrate 82 constitutes the cover for a sensor case for the acceleration sensor 81 in which a cavity 86 is very finely processed and formed by etching.

The semiconductor substrate 83 is formed with a temperature-sensing resistor element Z1 positioned upward in the direction of the Z axis, external connection pads (91a) and (92b) for connecting the temperature-sensing resistor element Z1 to the outside, and a space 87 extending through the Z axis.

The temperature-sensing resistor element Z1 is formed by etching based on a fine pattern diagram which represents a mask for manufacturing conductors to be formed on a bridge (not shown), which is formed on the top of the semiconductor substrate by, for example, etching, by depositing or crystal growing metal such as platinum or tungsten.

The temperature-sensing resistor element Z1 is formed on a diagonal line, in the X direction, or in the Y direction so that it is positioned at the center of the top of the substrate.

The external connection pads (91a) and (91b), and a lead pattern for electrically connecting the temperature-sensing resistor element Z1 and the external connection pads (91a) and (91b) are also formed by depositing or crystal growing metal such as platinum or tungsten as in the temperature-sensing resistor element Z1.

The semiconductor substrate 83 is formed of a sufficiently large size so that the external connection pads (91a) and (91b) appear on the surface of the substrate when it is joined together with the semiconductor substrate 82, and the upper surface of the space 87 aligns with the plane of the cavity 86 in the semiconductor substrate 82.

The semiconductor substrate 84 is formed with a heater H, two pairs of temperature-sensing resistor elements X1 and X2, and Y1 and Y2 facing the heater H and respectively disposed in the directions of the X and Y axes, then external connection pads (93a, 93b, 94a, 94b, 95a, 95b, 96a, 96b, 97a, and 97b) for connecting the heater H, and the temperature-sensing resistor elements X1, X2, Y1, and Y2 to the outside, and a space 88 extending through the semiconductor substrate 84 in the Z axis.

The heater H is formed so as to be positioned at the center of the space 88 on the top of the semiconductor substrate 84.

The heater H, and the pairs of temperature-sensing resistor elements X1 and X2, and Y1 and Y2 are formed by depositing and etching metal such as platinum and tungsten on a bridge (not shown) which is formed by etching as in the temperature-sensing resistor element Z1 on the semiconductor substrate 83.

The heater H and the temperature-sensing resistor elements X1, X2, Y1, and Y2 differ in that the resistance of the heater H is lower than the temperature-sensing resistor elements X1, X2, Y1, and Y2.

A lead pattern is also formed by deposition or the like and etching metal such as platinum or tungsten for electrically connecting the heater H and the temperature-sensing resistor elements X1, X2, Y1, and Y2 to the external connection pads (93a, 93b, 94a, 94b, 95a, 95b, 96a, 96b, 97a, and 97b).

The space 88 is formed in the same size as the space 87 to pass through the Z axis.

The semiconductor substrate 84 is formed of a sufficiently large size so that the external connection pads (93a, 93b, 94a, 94b, 95a, 95b, 96a, 96b, 97a, and 97b) appear on the surface of the substrate when it is joined together with the semiconductor substrate 83, and the upper surface of the space 88 aligns with the plane of the space 87 in the semiconductor substrate 83.

The semiconductor substrate 85 is formed with a temperature-sensing resistor element Z2 positioned downward in the direction fo the Z axis, external connection pads (92a) and (92b) for connecting the temperature-sensing element Z2 to the outside, and a space 89 which forms the bottom of the case of the sensor 81 in the downward direction of the Z axis.

The temperature-sensing resistor element Z2 is arranged to be paired with the temperature-sensing resistor element Z1 on the semiconductor substrate 83 with respect to the heater H on the semiconductor substrate 84.

The temperature-sensing resistor element Z2 is formed in a manner similar to that for the temperature-sensing resistor element Z1 on the semiconductor substrate 83. The semiconductor substrate 85 is formed of a sufficiently large size so that the external connection pads (92a) and (92b) appear on the surface of the substrate when it is joined together with the semiconductor substrate 84, and the upper surface of the space 89 aligns with the plane of the space 88 in the semiconductor substrate 84.

After the semiconductor substrates 82–85 are completely arranged, the semiconductor substrates 83, 84 and 85 are stacked and joined in the direction of the Z axis, so as to align the spaces 86–89, and a pressurized gas with a low heat transfer coefficient such as nitrogen or argon is introduced into the space while joining the semiconductor substrate 82 to form a pyramid-shaped acceleration sensor 81.

Positioning recesses may be provided in the upper surface of the semiconductor substrates 83–85 for accurately joining the semiconductor substrates 82–85.

Although the embodiment is described for a three-axis (X, Y, and Z axes) acceleration sensor, a two-axis (X and Y axes) acceleration sensor can be constituted by eliminating the semiconductor substrates 83 and 85, and providing a bottom on the space 88 in the semiconductor substrate 84 similar to the space 89 in the semiconductor substrate 85.

The thus-constituted acceleration sensor 81 can attain accurate positioning of the heater H and the temperature-sensing resistor elements X1, X2, Y1, Y2, Z1, and Z2 by using a fine-processing technique in the semiconductor manufacturing process so that alignment can be accurately achieved.

Also, since the temperature-sensing resistor elements X1, X2, Y1, Y2, Z1, and Z2 are formed on the same semiconductor substrate or the semiconductor substrates of the same production lot, the acceleration sensor 81 can be provided with good pairing (resistivity and temperature coefficient) of X1 and X2, Y1 and Y2, and Z1 and Z2.

Furthermore, because the acceleration sensor 81 is formed by the fine-processing technique in the semiconductor manufacturing process, it can be produced in the minimum size necessary for a sensor so that miniaturization can be attained.

FIGS. 22A and 22B are views of the external appearance of the acceleration sensor shown in FIG. 21.

Referring to FIGS. 22A and 22B, the acceleration sensor 81 has the semiconductor substrates 82–85 described with respect to FIG. 21, and is constituted in a pyramid-shaped acceleration sensor by stacking and joining the semiconductor substrates 82–85 in the direction of the Z axis.

Disposed in the closed space 90 formed by spaces 86–89 are the heater H, and the temperature-sensing resistor elements X1, X2, Y1, Y2, Z1, and Z2 for detecting acceleration in the three axes (X, Y, and Z axes). The pressurized gas 91 with a low heat transfer coefficient such as nitrogen or argon is also enclosed in the space 90.

In addition, disposed on the surface of the acceleration sensor 81 are the external connection pads (bonding pads 91a–97b) of the temperature-sensing resistor elements X1, X2, Y1, Y2, Z1, and Z2 and heater H for connection with an external acceleration detector circuit (not shown).

Detection of acceleration by the acceleration sensor 81 will be explained in the following section:

FIG. 23 is a diagram illustrating the operation of the acceleration sensor shown in FIG. 21.

Referring to FIG. 23, in the closed space 90 of the acceleration sensor 81 shown in FIGS. 21, 22A, and 22B, the heater H is disposed at the center of the X-Y plane and at the center of the Z axis, and a pair of temperature-sensing resistor elements X1 (resistance R1) and X2 (resistance R2) and a pair of temperature-sensing resistor elements Y1 (resistance R3) and Y2 (resistance R4) are disposed opposite to each other with respect to the X and Y axes, respectively, in symmetry with the heater H (resistance R).

In addition, a pair of temperature-sensing resistor elements Z1 (resistance R5) and Z2 (resistance R6) are disposed opposite to each other with respect to the Z axis in symmetry with the heater H (resistance R).

The heater H generates Joule heating corresponding to the electrical power ($V_o^2/R$ or $I_o^2 * R$) by driving it with an external power supply (for example, a voltage source $V_o$ or a current source $I_o$).

The gas 91 is heated by Joule heating, and a temperature distribution inversely proportional to the distance from the heater H is created in the closed space 90 with a steep temperature gradient.

Because the temperature-sensing resistor elements X1, X2, Y1, Y2, Z1, and Z2 are positioned at equal distances from the heater H in the X, Y and Z axes, respectively, when no acceleration (G) acts on the acceleration sensor 81, the temperature-sensing resistor elements are in an equal temperature environment and thermally balanced, and the resistances R1–R6 are in the relationships of R1=R2, R3=R4, and R5=R6.

When acceleration (G) occurs, for example, in the direction of the X (–X) axis as shown by arrow (G) in FIG. 23 in the thermally balanced state, the temperature distribution in the closed space 90 moves in the direction opposite to the direction of acceleration (G), the temperature balance between the temperature-sensing resistor elements X1 and X2 is destroyed to increase the temperature of the temperature-sensing resistor element X1, and to decrease that of the temperature-sensing resistor element X2.

Because the increase in the temperature of the temperature-sensing resistor element X1 increased the resistance R1, while a decrease in the temperature of the temperature-sensing resistor element X2 decreases the resistance R2, when an arrangement is made to detect acceleration (G) with a value corresponding to the resistance difference (R1–R2) between the resistances R1 and R2, the resistance difference (R1–R2) becomes a positive value (R1–R2>0) so that the magnitude of acceleration (G) can be detected from the value corresponding to the resistance difference, and the direction of acceleration (G) can be detected from the sign (+ or –) of the resistance difference, as described with respect to preceding embodiments of the present invention.

In contrast, when acceleration (G) acts in a direction opposite to the direction of the arrow in FIG. 23, the resistance difference (R1–R2) takes a negative value (R1–R2<0) so that the magnitude and the direction of acceleration (G) can be detected from a value corresponding to the resistance difference and its sign (+ or –), respectively.

When acceleration (G) acts only in the direction of the X axis, the temperature-sensing resistor elements Y1 and Y2, as well as Z1 and Z2 in the directions of the Y and Z axes are thermally balanced, therefore both the resistance difference (R3–R4) and (R5–R6) becomes zero, and the temperature-sensing resistor elements are not affected by acceleration (G).

Similarly, when acceleration (G) acts in the direction of the Y or Z axis, the thermal balance is destroyed in the temperature-sensing resistor elements Y1 and Y2 or Z1 and Z2 positioned in the direction of acceleration (G) so that the acceleration (G) can be detected from a value corresponding to the resistance difference (R3–R4) or (R5–R6) and their sign (+ or −).

FIGS. 24–27 are diagrams of acceleration detector circuits of the acceleration sensor shown in FIG. 21.

Figure 24:
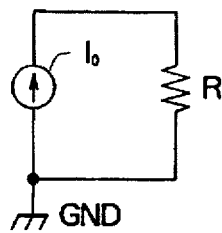
Figure 25:
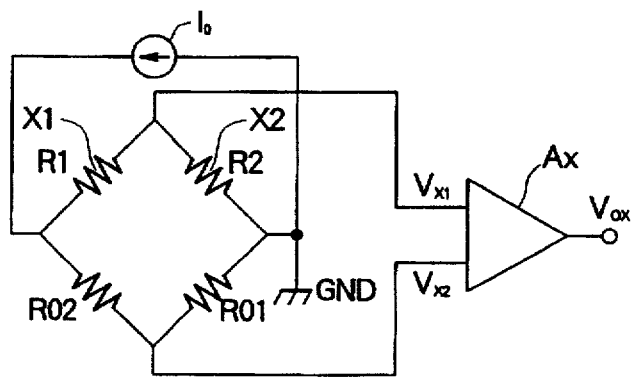
Figure 26:
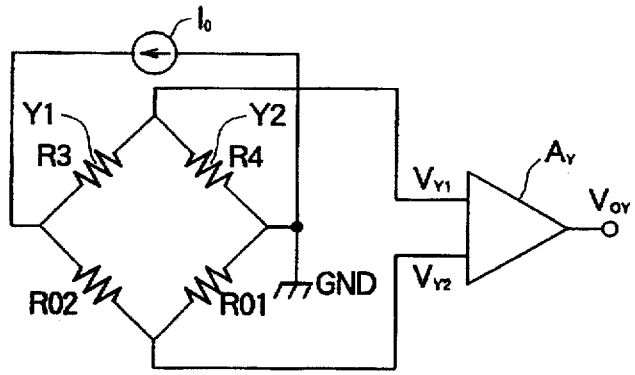
Figure 27:
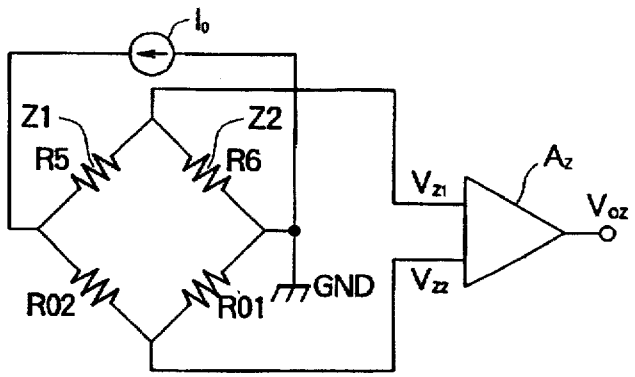

FIG. 24 shows a diagram of the heater driving circuit, FIG. 25 is a diagram of the acceleration detector circuit in the direction of the X axis, FIG. 26 is a diagram of the acceleration detector circuit in the direction of the Y axis, and FIG. 27 is a diagram of the acceleration detector circuit in the direction of the Z axis.

Although FIGS. 24–27 show examples of the driving power supply which is constituted by a current source ($I_o$), the driving power supply may be constituted by a voltage source ($V_o$).

The heater driving circuit shown in FIG. 24 supplies current to the resistance R of the Heater H from a current source ($I_o$) to generate Joule heating corresponding to the electrical power ($I_o^2 * R$).

The acceleration detector circuit in the direction of the X axis shown in FIG. 25 constitutes a resistor bridge circuit with the temperature-sensing resistor element X1 (resistance R1) and X2 (resistance R2), and standard resistors Ro1 and Ro2, and is arranged to output difference $V_{ox}$ ($V_{x1}-V_{x2}$) based on the bridge output voltage $V_{x1}$ and $V_{x2}$ through a differential amplifier $A_x$, and to obtain a detection output corresponding to acceleration (G) acting in the direction of the X axis.

FIGS. 26 and 27 similarly constitute a resistor bridge circuit, and are arranged to output difference $V_{oY}$ ($V_{Y1}-V_{Y2}$) and $V_{oZ}$ ($V_{Z1}-V_{Z2}$) based on the bridge output voltage $V_{Y1}$ and $V_{Y2}$, as well as $V_{Z1}$ and $V_{Z2}$, and to obtain a detection output corresponding to acceleration (G) acting in the direction of the Y or Z axis direction.

As described, because the absolute values and the directions of acceleration (G) acting in the X, Y and Z axis directions can be detected from the difference ($V_{oX}$, $V_{oY}$ and $V_{oZ}$) and their sign (+ or −), it is possible to detect acceleration (G) acting in any of three dimensional directions by providing a calculation means for calculating the mean square $\sqrt{(V_{oX}^2+V_{oY}^2+V_{oZ}^2)}$ and an orientation determination means for determining the quadrant of a three-dimensional XYZ coordinate system from the sign (+ or −) of each difference.

As described above, since the acceleration sensor 81 of FIG. 21 is arranged by forming the sensor case with the closed space, the heaters, a pair of temperature-sensing resistor elements disposed in each of multiple axis directions on a plurality of separate semiconductor substrate with the semiconductor manufacturing process, and by joining the plurality of semiconductor substrates in one direction, it is possible to easily align the plurality of temperature-sensing resistor elements with the multiple axes which are orthogonal to each other, and to form the temperature-sensing resistor elements with matched characteristics so that a very small acceleration sensor can be attained with less variation and higher accuracy.

Furthermore, since the acceleration sensor 81 employs pressurized gas with a low heat transfer coefficient as the gas to be enclosed in the closed space, it is possible to create a steep temperature gradient and to attain a sensor with high sensitivity.

As described above in detail for various embodiments, because embodiments of the present invention very finely process the semiconductor substrates and the like with a fine-processing technique in the semiconductor manufacturing process, accurately form the sensor case, the heater, the temperature-sensing resistor element, the heat-type temperature-sensing resistor element and the like, and accurately determine their relative placement, a miniaturized and economic acceleration sensor is provided which can detect acceleration acting on the sensor with a high accuracy.

Furthermore, because embodiments of the present invention enclose a pressurized inert gas with a low heat transfer coefficient in the closed space formed by the sensor case, an acceleration sensor is provided which can detect acceleration acting on the sensor with a high sensitivity by increasing the temperature gradient in the closed space.

Furthermore, because embodiments of the present invention dispose a pair of temperature-sensing resistor elements with good pairing (resistivity, and temperature coefficient) in the direction of acceleration, it can provide an acceleration sensor which can detect the absolute value and the direction of acceleration more accurately.

Furthermore, because one disclosed embodiment the present invention disposes a pair of temperature-sensing resistor elements with good pairing (resistivity, and temperature coefficient) in each of the three-dimensional axis directions, it can provide an acceleration sensor which can accurately detect acceleration acting in any of the three-dimensional directions.

What is claimed is:

1. An acceleration sensor having a temperature-sensing resistor element and a stationary gas disposed in a closed space with temperature distribution in an equilibrium state, said acceleration sensor detecting temperature at an unbalanced state of said temperature distribution, said unbalanced state being caused in response to acceleration acting on a sensor case, with a change in resistance of said temperature-sensing resistor element, wherein:

said temperature-sensing resistor element and a heater are formed on a surface of said sensor case by using a photoengraving process in a semiconductor manufacturing process.

2. An acceleration sensor according to claim 1, wherein said sensor case, a cavity, and a bridge are formed on at least one of a first semiconductor substrate and an insulating substrate by said photoengraving process, a heat-type temperature-sensing resistor element being integrally formed on said bridge by said photoengraving process and disposed in a closed space in which a gas is enclosed.

3. An acceleration sensor according to claim 2, wherein said sensor case is formed by joining at least one of a second semiconductor substrate and an insulating substrate, which has a cavity formed by said photoengraving process, to said first semiconductor substrate or insulating substrate, said closed space being formed by the cavities in said at least one first and second semiconductor substrate and insulating substrate, said gas being enclosed in said closed space.

4. An acceleration sensor according to any one of claims 2 to 3, wherein said heater is positioned at a center of said bridge, said bridge having a pair of temperature-sensing resistor elements opposing at a predetermined distance from said heater.

5. An acceleration sensor according to claims 2 or 3, wherein said bridge is formed with a pair of said heat-type temperature-sensing resistor elements opposing at a predetermined distance from the center.

6. An acceleration sensor having a temperature-sensing resistor element disposed in a closed space with temperature distribution in an equilibrium state, said acceleration sensor detecting temperature at an unbalanced state of said temperature distribution, said unbalanced state being caused in response to acceleration acting on the acceleration sensor, with a change in resistance of said temperature-sensing resistor element, said acceleration sensor comprising:

a sensor case for forming said closed space, a stationary gas enclosed in said sensor case, a heater for creating a temperature distribution in said closed space by heating said gas, said temperature-sensing resistor element for detecting a temperature change caused by movement of said gas with temperature distribution when acceleration acts on said sensor case.

7. An acceleration sensor according to claim 6, wherein said temperature-sensing resistor element is disposed at a predetermined distance from said heater in the direction of acceleration.

8. An acceleration sensor according to claim 6 or 7 further comprising a temperature-sensing resistor element for temperature compensation for detecting the ambient temperature, and an acceleration correction means for correcting an output signal from said temperature-sensing resistor element based on an output signal from said temperature-sensing resistor element for temperature compensation.

9. An acceleration sensor having temperature-sensing resistor elements disposed in a closed space with temperature distribution in an equilibrium state, said acceleration sensor detecting temperature at an unbalanced state of said temperature distribution, said unbalanced state being caused in response to acceleration acting on the acceleration sensor with a change in resistance of said temperature-sensing resistor elements, said acceleration sensor comprising:

a sensor case for forming said closed space, a stationary gas enclosed in said sensor case, a pair of heat-type temperature-sensing resistor elements provided in said sensor case for creating temperature distribution in said space by heating said gas and for detecting the temperature change caused by movement of said gas from the action of acceleration, and a pair of standard resistors for forming a bridge circuit together with said pair of heat-type temperature-sensing resistor elements.

10. An acceleration sensor according to claim 9, wherein said pair of heat-type temperature-sensing resistor elements are disposed at a predetermined distance from a heater in a direction of acceleration.

11. An acceleration sensor according to claim 9 or 10 further comprising a plurality of heaters disposed in a direction of acceleration and positioned on both sides of said pair of heat-type temperature-sensing resistor elements.

12. An acceleration sensor having temperature-sensing resistor elements disposed in a closed space with the temperature distribution in an equilibrium state, said acceleration sensor detecting temperature at an unbalanced state of said temperature distribution, which unbalanced state is caused in response to acceleration acting on a sensor case, with a change of resistance of said temperature-sensing resistor elements, said acceleration sensor comprising:

a sensor case for forming a closed space in which a gas is enclosed, a heater disposed in said closed space, for creating temperature distribution in said closed space by heating a gas, and a pair of temperature-sensing resistor elements opposing said heater and disposed in each of multiple axis directions, wherein said closed space said heater and said pair of temperature-sensing resistor elements disposed in each of multiple axis directions are formed on a plurality of separate semiconductor substrates, said plurality of semiconductor substrates joined together in one direction.

13. An acceleration sensor according to any one of claim 2, 3, 6, 9 or 12 wherein said gas being enclosed in said closed space is a pressurized gas with a low heat transfer coefficient.

14. An acceleration sensor comprising a first semiconductor substrate having a cavity formed therein, a second semiconductor substrate having an integral bridge extending over a cavity formed in said second semiconductor substrate, a temperature-sensing resistor element formed on said bridge, said first and second semiconductor substrates joined together with said first semiconductor substrate cavity facing said second semiconductor substrate cavity for forming a closed spaced surrounding said bridge, a stationary gas enclosed within said closed space.

15. An acceleration sensor according to any one of claim 1, 6, 9 or 14 wherein said gas is selected from the group consisting of: nitrogen, argon.

16. An acceleration sensor according to any one of claim 1, 6, 9 or 14 wherein said gas is a pressurized inert gas.

17. An acceleration sensor according to claim 14, wherein a third semiconductor substrate is provided, said third semiconductor substrate having an integral bridge extending over a through hole formed in said semiconductor substrate, and a temperature-sensing resistor element formed on said bridge of said third semiconductor substrate, said third semiconductor substrate being positioned between and joined to said first and second semiconductor substrates with said through hole forming a portion of said closed space.

18. An acceleration sensor according to claim 17, wherein a fourth semiconductor substrate is provided, said fourth semiconductor substrate having an integral bridge extending over a through hole formed in said fourth semiconductor substrate, and a temperature-sensing resistor element formed on said bridge of said fourth semiconductor substrate, said fourth semiconductor substrate positioned between and joined to said second and third semiconductor substrates with said through hole of said fourth semiconductor substrate forming a portion of said closed space.

19. An acceleration sensor according to claim 18, wherein a heater is provided on said bridge of said fourth semiconductor substrate.

20. An acceleration sensor according to claim 19, wherein two pairs of temperature-sensing resistor elements are formed on said bridge of said fourth semiconductor substrate.

21. An acceleration sensor according to claim 20, wherein said two pairs of temperature-sensing resistor elements are positioned perpendicular to each other for separately sensing acceleration in perpendicular directions.

22. An acceleration sensor according to claim 21, wherein said heater is positioned between the temperature-sensing resistor elements of each said pair of temperature-sensing resistor elements.

23. An acceleration sensor according to claim 18, wherein said fourth semiconductor substrate is smaller than said second semiconductor substrate, said third semiconductor substrate is smaller than said fourth semiconductor substrate, and a first semiconductor substrate is smaller than said third semiconductor substrate for forming a pyramid-shaped sensor with a perimeter upper surface of each of said second, third and fourth semiconductor substrates exposed for making electrical connections to said temperature-sensing resistor elements.

* * * * *